United States Patent
Knas et al.

(10) Patent No.: US 11,157,876 B1
(45) Date of Patent: Oct. 26, 2021

(54) INTELLIGENT EMPLOYMENT-BASED BLOCKCHAIN

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US); Krzysztof Gibadlo, Springfield, MA (US); Rick Ferry, Springfiled, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 239 days.

(21) Appl. No.: 15/951,492

(22) Filed: Apr. 12, 2018

Related U.S. Application Data

(60) Provisional application No. 62/484,806, filed on Apr. 12, 2017.

(51) Int. Cl.
*H04L 1/06* (2006.01)
*H04L 29/06* (2006.01)
(Continued)

(52) U.S. Cl.
CPC ......... *G06Q 10/105* (2013.01); *H04L 9/0637* (2013.01); *H04L 9/0643* (2013.01);
(Continued)

(58) Field of Classification Search
CPC ... G06Q 10/105; H04L 9/0637; H04L 9/0643; H04L 63/10; H04L 63/123; H04L 2209/38
(Continued)

(56) References Cited

U.S. PATENT DOCUMENTS

| | | |
|---|---|---|
| 8,789,072 B2 | 7/2014 | Klein |
| 9,992,022 B1 | 6/2018 | Chapman et al. |

(Continued)

OTHER PUBLICATIONS

Adam Back et al., "Enabling Blockchain Innovations with Pegged Sidechains", Oct. 22, 2014, retrieved from https://www.blockstream.com/sidechains.pdf (Year: 2014).*

(Continued)

*Primary Examiner* — Sangeeta Bahl
*Assistant Examiner* — Joshua D Schneider
(74) *Attorney, Agent, or Firm* — Foley & Lardner LLP

(57) ABSTRACT

A computer-implemented method comprises receiving a first request to update an employment record associated with a user in a first blockchain; generating a graphical user interface configured to receive data associated with a second blockchain; receiving a first set of data associated with the second blockchain comprising identification of a block chain instance associated with the second blockchain and a first network node; generating an instruction to the first network node associated with the second blockchain to receive a latest valid second blockchain; generating a hash value based at least on one of the user, a hash value associated with the first block instance, the first network node, and the first computing device; appending, the second blockchain to the first block instance by updating a block instance associated with the second blockchain with the hash value; and transmitting the second block instance to the first computing device.

20 Claims, 7 Drawing Sheets

(51) Int. Cl.
*G06Q 10/10* (2012.01)
*H04L 9/06* (2006.01)
(52) U.S. Cl.
CPC ............ *H04L 63/10* (2013.01); *H04L 63/123* (2013.01); *H04L 2209/38* (2013.01)
(58) Field of Classification Search
USPC ............................................................ 705/1
See application file for complete search history.

(56) References Cited

U.S. PATENT DOCUMENTS

| | | | |
|---|---|---|---|
| 2003/0097342 A1 | 5/2003 | Whittingtom | |
| 2007/0208799 A1 | 9/2007 | Hughes | |
| 2015/0332283 A1* | 11/2015 | Witchey | G06F 21/00 |
| | | | 705/3 |
| 2016/0028552 A1* | 1/2016 | Spanos | H04L 9/3236 |
| | | | 713/178 |
| 2016/0330034 A1* | 11/2016 | Back | H04L 9/3255 |
| 2017/0161439 A1 | 6/2017 | Raduchel et al. | |
| 2017/0230375 A1* | 8/2017 | Kurian | H04L 63/102 |
| 2017/0323392 A1* | 11/2017 | Kasper | H04L 63/123 |
| 2018/0068130 A1* | 3/2018 | Chan | G06F 21/6227 |
| 2018/0103042 A1* | 4/2018 | Castagna | H04L 63/08 |
| 2018/0150835 A1 | 5/2018 | Hunt et al. | |
| 2018/0165476 A1* | 6/2018 | Carey | G06F 21/577 |
| 2018/0189753 A1 | 7/2018 | Konda et al. | |
| 2018/0218003 A1* | 8/2018 | Banga | G06F 16/137 |
| 2018/0225660 A1* | 8/2018 | Chapman | G06Q 20/401 |
| 2018/0260888 A1 | 9/2018 | Paolini-Subramanya et al. | |
| 2019/0180276 A1* | 6/2019 | Lee | H04L 9/3239 |

OTHER PUBLICATIONS

Karl Wust et al., "Do you need a Blockchain?", IACR Cryptology EPrint, 2017, retrieved from https://eprint.iacr.org/2017/375.pdf (10 pages).

* cited by examiner

INTELLIGENT EMPLOYMENT-BASED BLOCKCHAIN

CROSS-REFERENCE TO RELATED APPLICATIONS

This application claims priority to U.S. Provisional Application No. 62/484,806, filed Apr. 12, 2017, which is hereby incorporated by reference in its entirety.

TECHNICAL FIELD

This application relates generally to generating and manipulating datasets stored in blockchains.

BACKGROUND

Employees are continuously changing jobs, so the resumes and references of those employees are often updated with new or additional information. Many new employers must verify the information within the employees resumes. A problem that exists with employment verification is the amount of administrative work to contact each previous employer and verify certain information. As expected, this manual process is tedious, time-consuming, inefficient, and sometimes inaccurate. For example, a previous employer may not be as easily accessible or may transmit false information regarding the employee.

As the processing power of computers allow for greater computer functionality and the Internet technology era allows for interconnectivity between computing systems, many institutions store employee data records electronically. These institutions simply store the data in a database and retrieve it when necessary. However, since the implementation of these more sophisticated online tools, several shortcomings in these technologies have been identified and have created a new set of challenges. First, existing and conventional methods fail to provide fast and efficient analysis due to a high volume of customer information existing on different networks and computing infrastructures. Managing such information on different platforms is difficult due to number, size, content, or relationships of the data associated with the customers. Second, information stored in a database may be susceptible to risk and/or fraudulent modification. For example, the database may be subject to cyber-attacks. Third, access to previous employer's databases may be limited due to security concerns. For instance, an employee may not have access to an employer's database once he decides to change employers. As a result, employment data records are not transferrable with the employee.

SUMMARY

For the aforementioned reasons, there is a need for a more accurate system and method, which would allow employees to accurately store and access employee records, profile, and other pertinent employment information in a more efficient manner than possible with human-intervention or conventional data-driven software solutions. Disclosed herein are systems and methods for dynamic generation of an intelligent employment-based blockchain using distributed databases.

Distributed databases such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein.

The linked blocks (or blockchain) may be distributed among multiple network nodes within a computer network such that each node may maintain a copy of the blockchain. Malicious network nodes attempting to compromise the integrity of the database have to recreate and redistribute the blockchain faster than the honest network nodes, which, in most cases, is computationally infeasible. In other words, data integrity is guaranteed by the virtue of multiple network nodes in a network having a copy of the same blockchain. A central trust authority is therefore not required to vouch for the integrity of the distributed database hosted by multiple nodes in the network.

In one embodiment, a computer-implemented method comprises receiving, by a server from a first network node, a first request to generate an employment record associated with a user operating the first network node; generating, by a server, a graphical user interface to be displayed on the first network node, the graphical user interface comprising a plurality of input fields configured to receive data associated with employment of the user; upon displaying the graphical user interface on the first network node, receiving, by the server, a first set of data associated with employment of the user; generating, by the server, a user employment record of the user in a non-blockchain system database configured to store a plurality of user employment records, the user employment record comprising one or more data fields containing the first set of data; generating, by the server, a first cryptographic hash value based at least on one of the user, the first set of data, and the first network node, according to a hashing algorithm; updating, by the server, a first block instance of an employment blockchain with the first cryptographic hash value, the first block instance being stored within the first network node; receiving, by the server from a second network node, a second request to update the employment blockchain; upon displaying the graphical user interface on the second network node, receiving, by the server, a second set of data associated with employment of the user; updating, by the server, the user employment record of the user in the non-blockchain system database based on the second set of data; retrieving, by the server, a latest valid employment blockchain, wherein content of the latest valid employment blockchain is confirmed by the first network node; appending, by the server, a second block instance to the first block instance by: generating a second cryptographic hash value identifying the user, the second set of data, and the second network node, according to a hashing algorithm; and updating a second block instance with the second cryptographic hash value, the second block instance being stored at least within the second network node; transmitting, by the server, the second block instance to the first network node.

In another embodiment, a computer system comprises a plurality of network nodes comprising at least a first network node and a second network node; a non-blockchain system database configured to store a plurality of user employment records; and a server communicatively in connection with the plurality of network nodes and the non-blockchain system database, wherein the server is configured to receive, from the first network node, a first request to generate an employment record associated with a user operating the first network node; generate a graphical user interface to be displayed on the first network node, the graphical user interface comprising a plurality of input fields configured to receive data associated with employment of the user; upon displaying the graphical user interface on the first network node, receiving a first set of data associated with employment of the user; generate a user employment record of the user in the non-blockchain system database; generate a first cryptographic hash value based at least on one of the user, the first set of data, and the first network node, according to a hashing algorithm; update a first block instance of an employment blockchain with the first cryptographic hash value, the first block instance being stored within the first network node; receive, from the second network node, a second request to update the employment blockchain; upon displaying the graphical user interface on the second network node, receive a second set of data associated with employment of the user; update the user employment record of the user in the non-blockchain system database based on the second set of data; retrieve a latest valid employment blockchain, wherein content of the latest valid employment blockchain is confirmed by the first network node; append a second block instance to the first block instance by generating a second cryptographic hash value identifying the user, the second set of data, and the second network node, according to a hashing algorithm; and updating a second block instance with the second cryptographic hash value, the second block instance being stored at least within the second network node; transmit the second block instance to the first network node.

In another embodiment, a method comprises receiving, by a server, from a computing device, a request to update an employment record associated with a user, the employment record corresponding to a first blockchain stored on a plurality of first network nodes, the first request instructing the server to append a second blockchain stored on a plurality of second network nodes to the first blockchain, wherein the first request comprises a first set of data identifying: the second blockchain, a block instance within the first blockchain associated with the second blockchain, and a first network node associated with the block instance; retrieving, by the server, a latest valid second blockchain by generating and transmitting an instruction to the first network node, the instruction configured to receive a latest valid second blockchain; generating, by the server, a hash value based at least on one of the user, a hash value associated with the block instance, and the first network node, according to a hashing algorithm; appending, by the server, the second blockchain to the block instance within the first blockchain by updating a block instance associated with the second blockchain with the hash value; and transmitting, by the server, the block instance and the second blockchain to the plurality of first network nodes.

In another embodiment, a computer system for managing distributed data sources comprises a plurality of first network nodes storing a first blockchain; a plurality of second network nodes storing a second blockchain; a computing device operated by a user associated with the first and the second blockchain; a server communicatively in connection with the first plurality of network nodes, the second plurality of network nodes, and the computing device, wherein the server is configured to receive, from a computing device, a request to update an employment record associated with a user, the employment record corresponding to the first blockchain stored on the plurality of first network nodes, the first request instructing the server to append the second blockchain stored on the plurality of second network nodes to the first blockchain, wherein the first request comprises a first set of data identifying the second blockchain, a block instance within the first blockchain associated with the second blockchain, and a first network node associated with the block instance; retrieve a latest valid second blockchain by generating and transmitting an instruction to the first network node, the instruction configured to receive a latest valid second blockchain; generate a hash value based at least on one of the user, a hash value associated with the block instance, and the first network node, according to a hashing algorithm; append the second blockchain to the block instance within the first blockchain by updating a block instance associated with the second blockchain with the hash value; and transmit the block instance and the second blockchain to the plurality of first network nodes.

In another embodiment, a method comprises receiving, by a server, a request to generate a customized dataset, wherein the request is received from a computing device operated by a user; generating, by the server, a first instruction to receive a latest valid blockchain from a plurality of network nodes, the latest valid blockchain comprising one or more block instances comprising data associated with the user and a corresponding hash value, wherein each block instance is stored on a database associated with at least one of the plurality of network nodes; upon transmitting the first instruction, receiving, by the server, the latest valid blockchain from each network node of the plurality of network nodes; comparing, by the server, the hash value associated with each block instance with each respective hash value associated with each respective block instance within each latest valid blockchain received from each network node of the plurality of network nodes; upon a number of matching hash values satisfying a pre-determined threshold, generating, by the server, a second instruction to receive the data associated with each block instance from the plurality of the network nodes; upon transmitting the second instruction to the plurality of network nodes, receiving, by the server, the data within each block instance within the latest valid blockchain from each of the network nodes of the plurality of network nodes; generating, by the server, a graphical user interface configured display the data associated with the latest valid blockchain on the computing device operated by the user; upon displaying the graphical user interface on the computing device, receiving, by the server, from the user, a selection of the data associated with the latest valid blockchain and an encryption key; encrypting, by the server utilizing the received encryption key, the selection of data; generating, by the server, a blockchain address corresponding to the selected decrypted data, wherein the blockchain address corresponds to each block instance containing the selected decrypted data; and transmitting, by the server, the blockchain address to the computing device associated with the user.

In another embodiment, a computer system comprises a plurality of network nodes hosting a blockchain; a computing device operated by a user associated with the blockchain; and a server communicatively in connection with the computing device and the plurality of network nodes, wherein the server is configured to: receive a request to generate a customized dataset, wherein the request is received from a computing device operated by a user; generate a first instruction to receive a latest valid blockchain from a plurality of network nodes, the latest valid blockchain comprising one or more block instances comprising data associated with the user and a corresponding hash value, wherein each block instance is stored on a database associated with at least one of the plurality of network nodes; upon transmitting the first instruction, receive the latest valid blockchain from each network node of the plurality of network nodes; compare the hash value associated with each block instance with each respective hash value associated with each respective block instance within each latest valid blockchain received from each network node of the plurality of network nodes; upon a number of matching hash values satisfying a pre-determined threshold, generate a second instruction to receive the data associated with each block instance from the plurality of the network nodes; upon transmitting the second instruction to the plurality of network nodes, receive the data within each block instance within the latest valid blockchain from each of the network nodes of the plurality of network nodes; generate a graphical user interface configured display the data associated with the latest valid blockchain on the computing device operated by the user; upon displaying the graphical user interface on the computing device, receive from the user, a selection of the data associated with the latest valid blockchain and an encryption key; encrypt, utilizing the received encryption key, the selection of data; generate a blockchain address corresponding to the selected decrypted data, wherein the blockchain address corresponds to each block instance containing the selected decrypted data; and transmit the blockchain address to the computing device associated with the user.

In another embodiment, a method comprises receiving, by a server, a request to generate an employee dataset comprising one or more users, wherein the request is received from a computing device operated by a first user; generating, by the server, a first instruction to receive, from a plurality of network nodes, a plurality of latest valid blockchain associated with a plurality of users, wherein the plurality of latest valid blockchains comprises one or more block instances comprising data associated with the plurality of users and one or more corresponding hash values, wherein each block instance is stored in a database associated with at least one of the plurality of network nodes; upon transmitting the first instruction, receiving, by the server, the plurality of latest valid blockchains from each network node of the plurality of network nodes; comparing, by the server, the hash value associated with each block instance with each respective hash value associated with each respective block instance within each latest valid blockchain received from each network node of the plurality of network nodes; upon a number of matching hash values satisfying a pre-determined threshold, generating, by the server, a second instruction to receive the data associated with each block instance from the plurality of the network nodes; upon transmitting the second instruction to the plurality of network nodes, receiving, by the server, the data within each block instance within the plurality of latest valid blockchains from each of the network nodes of the plurality of network nodes; generating, by the server based on each valid latest blockchain, a score corresponding to each user; generating, by the server, one or more blockchain addresses corresponding to a selection of the plurality of latest valid blockchains, wherein each selected latest valid blockchains satisfies a pre-determined threshold transmitting, by the server, the one or more blockchain addresses to the computing device operated by the first user.

In yet another embodiment, a computer system comprises a plurality of network nodes hosting a blockchain; a first user operating a computing device; and a server communicatively in connection with the plurality of network nodes and the computing device, wherein the server is configured to receive a request to generate an employee dataset comprising one or more users, wherein the request is received from a computing device operated by a first user; generate a first instruction to receive, from a plurality of network nodes, a plurality of latest valid blockchain associated with a plurality of users, wherein the plurality of latest valid blockchains comprises one or more block instances comprising data associated with the plurality of users and one or more corresponding hash values, wherein each block instance is stored in a database associated with at least one of the plurality of network nodes; upon transmitting the first instruction, receive the plurality of latest valid blockchains from each network node of the plurality of network nodes; compare the hash value associated with each block instance with each respective hash value associated with each respective block instance within each latest valid blockchain received from each network node of the plurality of network nodes; upon a number of matching hash values satisfying a pre-determined threshold, generate a second instruction to receive the data associated with each block instance from the plurality of the network nodes; upon transmitting the second instruction to the plurality of network nodes, receive the data within each block instance within the plurality of latest valid blockchains from each of the network nodes of the plurality of network nodes; generate, based on each valid latest blockchain, a score corresponding to each user; generate one or more blockchain addresses corresponding to a selection of the plurality of latest valid blockchains, wherein each selected latest valid blockchains satisfies a pre-determined threshold transmit the one or more blockchain addresses to the computing device operated by the first user.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Figure 1:
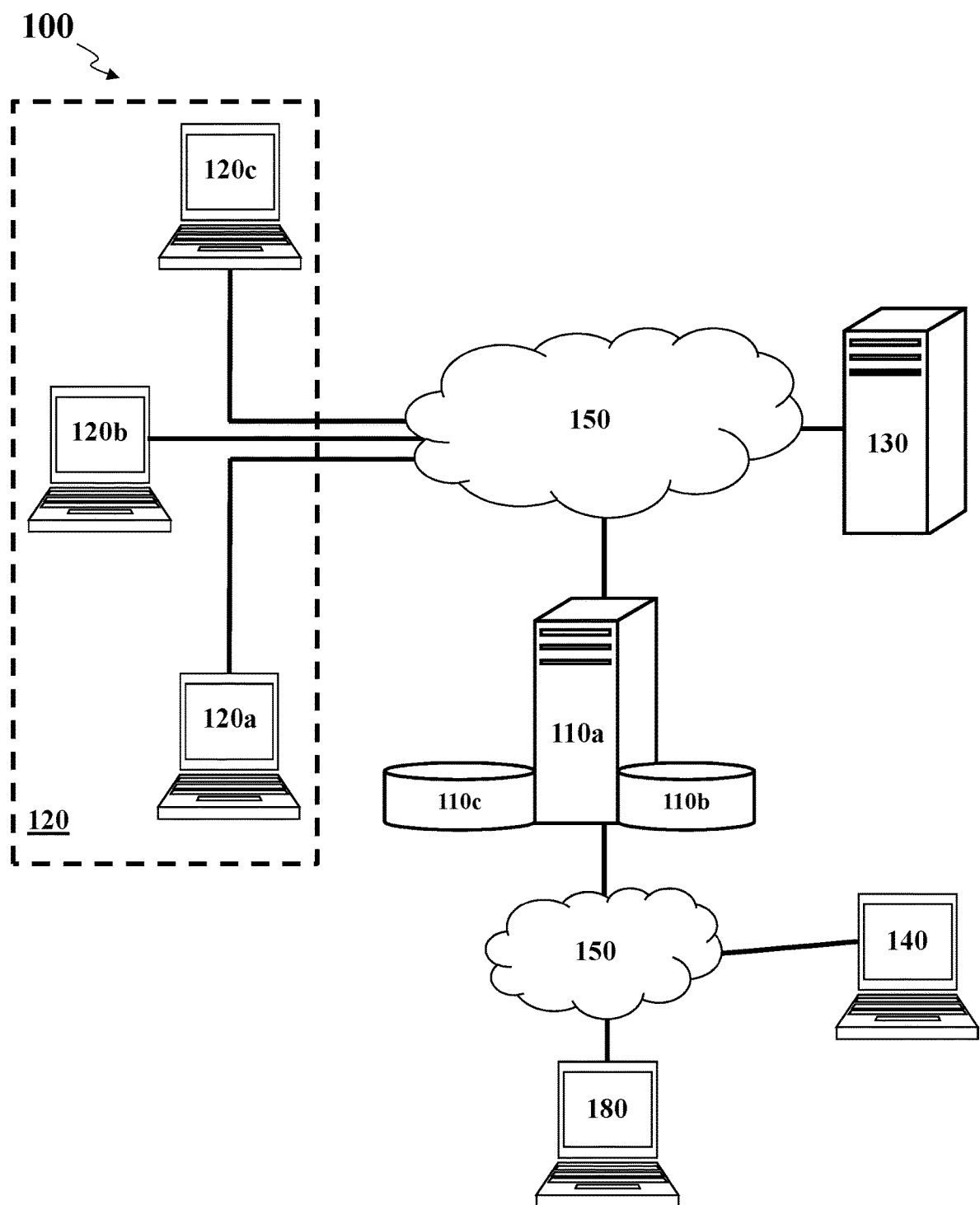
FIG. 1 illustrates an example of a computer system for generating an intelligent employment-based blockchain, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of an exemplary system 100 for generating an intelligent employment-based blockchain, according to an exemplary embodiment. The exemplary system 100 may comprise an analytics server 110a, system database 110b, a key storage database 110c, a client device 140, manager's device 180, third party database 130, and distributed network nodes 120a-c. Aspects of the system 100 may be configured to employ and manage a system blockchain, sometimes referred to in the art as a "distributed ledger," and may include blockchain-based distributed ledger software (e.g., Hyperledger, Ethereum, Openchain, and TerraLedger). The system blockchain may operate as a distributed database that stores data records associated with users and transaction documents, where the data records stored on the system blockchain may be blocks of data (e.g., block instances or blocks) that are hosted (e.g., locally stored or otherwise in possession of each distributed, such as being remotely hosted or hosted in a cloud) on distributed network nodes 120a-c. The data stored in records within system databases 110b may vary from the data stored in blocks of the system blockchain hosted on network nodes 120a-c. Furthermore, each block may not be accessible to other network nodes, however all block instances may be accessed by the analytics server 110a and/or may be stored in the system database 110b. In some embodiments, the analytics server 110a may generate a duplicate of one or more block instances within an employment blockchain and store said block instances in the system database 110b.

While the analytics server 110a may dictate accessibility and transmit instructions to other parties within system 100, each network node within the distributed network nodes 120a-c (e.g., creator of the block instance) or the client (via the client device 140) may prevent others within system 100 from accessing at least portions of the data within one or more block instances. For example, while generating a block instance, a portion of the data within the block instance may be designated as private. For example, a portion of the blockchain may be encrypted so one or more network nodes are unable to access the encrypted portion. Encryption and decryption of data is described in detail below.

An analytics server 110a may generate and display a user interface on the client device 140, each node within the distributed network nodes 120a-c, and the manager's device 180. An example of the user interface generated and hosted by the analytics server 110a may be a website. The analytics server 110a may host a website accessible to end-users, where the content presented via the various webpages may be controlled based upon each particular user's role. The analytics server 110a may be any computing device comprising a processor and non-transitory machine-readable storage capable of executing the various tasks and processes described herein. Non-limiting examples of such computing devices may include workstation computers, laptop computers, server computers, laptop computers, and the like.

While the exemplary system 100 includes a single analytics server 110a, in some configurations, the analytics server 110a may include any number of computing devices operating in a distributed computing environment.

The analytics server 110a may execute software applications configured to display the user interface (e.g., host a website), which may generate and serve various webpages to client device 140 or each network node within the distributed network nodes 120a-c. The website may be used to generate and access data stored on a system database 110b or a blockchain hosted by nodes 120a-c and managed by the analytics server 110a. In some implementations, the analytics server 110a may be configured to require user authentication based upon a set of user authorization credentials (e.g., username, password, biometrics, cryptographic certificate, and the like). In such implementations, the analytics server 110a may access a system database 110b configured to store user credentials, which the analytics server 110a may be configured to reference in order to determine whether a set of entered credentials (purportedly authenticating the user) match an appropriate set of credentials that identify and authenticate the user.

In some configurations, the analytics server 110a may generate and host webpages to a client device 140 or manager's device 180 based upon a user's role within the system 100 (e.g., administrator, employee, or the employer). In such implementations, the user's role may be defined by data fields and input fields in user records stored in the system database 110b. The analytics server 110a may authentication the user and may identify the user's role by executing an access directory protocol (e.g. LDAP). The analytics server 110a may generate webpage content, access or generate data stored in the system database 110b, and access or generate data stored in the blockchain instances, according to the user's role defined by the user record in the system database 110b.

The analytics server 110a may also generate, access, and update blockchain instances hosted on network nodes 120a-c, according to instructions received from a client device 140, manager's device 180, and/or any of the nodes within the network nodes 120a-c. Software executed by the analytics server 110a may provide blockchain services to users interacting with the analytics server 110a. For example, the analytics server 110a may provide blockchain services to the client device 140, manager's device 180, or nodes 120a-c via the user interface provided to (e.g., displayed on) these computing devices. In some embodiments, the analytics server 110a may update and query records in the system database 110b according to the instructions received from the client device 140. The analytics server 110a may then generate block instances for the system blockchain, where the block instances contain data from the records of the system database 110b and/or data received from any of the network nodes. The analytics server 110a may then update a local instance of the system database 110b, and subsequently instruct network nodes 120a-c to update the instances of the system blockchain stored locally on each of the network nodes 120a-c.

The analytics server 110a may also generate each new block instance with a timestamp or other data that links the new block instance with existing block instances on the blockchain. As an example, when the analytics server 110a generates a new user record in the system database 110b, the analytics server 110a then generates a hash value for the user based upon one or more data fields of the user record. The analytics server 110a may then generate a new block instance for the system blockchain within the local instance of the blockchain stored in the analytics server 110*a* (or a database associated with the analytics server 110*a*). The analytics server 110*a* then transmits the updated block instance to each respective network node 120*a-c*. The network nodes 120*a-c*, in turn, may update the local instances of the blockchain stored on each of the network nodes 120*a-c* by appending the newly generated block instance to the existing blockchain.

In operation, when a user instructs the analytics server 110*a* to conduct a service requiring a query of the block instances of the blockchain or when a user (or a network node) requires modification/update of a block instance, the analytics server 110*a* may conduct a poll of all the parties associated with the blockchain (e.g., the network nodes 120*a-c* and/or the client device 140) to identify the queried or modified data, based on the hash values identifying the block instances, and then determine whether the data within the identified block instances is accurate. The analytics server 110*a* may await a response from a predetermined quorum of network nodes 120*a-c*, the manager's device 180, or the client device 140 to confirm the data is accurate. The analytics server 110*a* may then proceed with a rendering the service or modifying the block using the data blocks of the blockchain, if a predetermined threshold number of network nodes 120*a-c* indicates that the blocks at issue match the blocks of the instance stored locally on each of the network nodes 120*a-c* or approve the modification. In some configurations, a pre-determined number of quorums may always not be necessary to proceed. For example, when the analytics server receives an instruction from the client device 140 to update a blockchain (e.g., append new information in form of a new block instance) associated with a previous employer (stored in node 120*b*), the analytics server may await receipt of approval from 120*b* even if a quorum is met.

The analytics server 110*a* may generate block addresses for data to be retrieved from blockchain instances of the system blockchain. Machine-readable computer files containing various forms of documents (e.g., PDF, DOC, and XLS) may be uploaded and stored into the system database 110*b*. The analytics server 110*a* may also generate a hash value of the document, where the application uses the hash value or other identifier values to reference the file from the system database 110*b*. The analytics server 110*a* may then generate the block address for the file by generating a hash of the document and a hash value of the immediately preceding block data or block address. This block address may then be stored into the system database 110*b* in a document record along with the file and any number of additional data field entries related to the computer file.

In operation, the analytics server 110*a* or network nodes 120*a-c* may reference the block of the blockchain containing the file according to the block address. The analytics server 110*a* may generate additional blocks and corresponding block addresses on the system blockchain in a similar manner (e.g., generating a hash value for a block containing user data and then generating a new block address using the block address of the preceding block). Block addresses may be generated in any number of combinations of hashed block data and/or hashed block addresses from the new block and one or more preceding blocks, such that the address of the new block is dependent upon, or otherwise linked to, at least the immediately preceding block.

In some implementations, a system blockchain may contain data regarding a client's employment history. The analytics server 110*a* may manage an employment history blockchain, where each block instance within the blockchain represents an employer or another institution relevant to the client's employment (e.g., educational institution or the like) and store pertinent data within the system database 110*b*. Non-limiting examples of what may be stored in the system database 110*b* may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files), employment records inputted by each previous employer, parsed portions of such computer files, or metadata associated with computer files; and application data that may include software instructions executed by the analytics server 110*a* or data used by applications executed by the analytics server 110*a*.

User records stored on the system database 110*b* may comprise a data field containing a user-identifying hash value generated by the analytics server 110*a* according to a hashing algorithm implemented by a system blockchain, when a new user record is generated or updated. The hash value (sometimes referred to as the encrypted hash value) may be generated using one or more data fields that describe the user, which may be entered by a user via a website portal or retrieved from the user record in the system database 110*b*. The hash value may be a unique identifier for the particular user record, and may be used by various computing devices of the system 100 to reference the user data, which may be stored in the system database 110*b* and/or on blocks of the system blockchain that is hosted on network nodes 120*a-c*. The system database 110*b* may be hosted on any number computing devices comprising a non-transitory machine-readable storage medium and capable of performing the various tasks described herein. As shown in FIG. 1, the system database 110*b* may be accessed by the analytics server 110*a* via one or more networks.

Document records stored on the system database 110*b* may comprise one or more data fields containing document-identifying hash values generated by the analytics server 110*a* according to a hashing algorithm implemented by a system blockchain. When a new document record containing a machine-readable computer file (e.g., PDF, DOC, XSL), such as an employment recognition or award documents, is received, the analytics server 110*a* may store the new document record in the system database 110*b*. The analytics server 110*a* may also generate a hash value for the new document record and may store the corresponding hash value in the system database 110*b*. The encrypted hash value may be a unique identifier for the particular document record, and may be used by various computing devices of the system 100, such as the system database 110*b*, to reference the computer file or metadata describing the computer file, which may be stored in the system database 110*b* and/or on block instance of the system blockchain that is hosted on network nodes 120*a-c*.

A key storage database 110*c*, sometimes referred in the art as a high security module, key appliance, certificate authority, or the like, may be a computing device configured to manage and distribute encryption keys and cryptographic certificates to various computing devices in the system 100 according to predetermined user roles and existing rules. In some implementations, encryption keys may be used for authentication of users when users log into a website (or any other user interface provided to the users) hosted on the analytics server 110*a*. In some implementations, encryption keys may be used to encrypt the data within the block instance of the system blockchain and to prevent unauthorized access. Additionally or alternatively, encryption keys may be used to confirm or "sign" data transfers or to confirm that the data originated from a known party. Encryption keys may be also be used by users at an application level to apply a digital signature to a document or contract, which, in some cases, may trigger instructions from script code of a smart contract stored on the system blockchain. Furthermore, as described in FIG. 6, encryptions may be used to transmit a customized portion of the blockchain to one or more recipients.

The key storage database 110c may be hosted on any number computing devices comprising a non-transitory machine-readable storage medium and capable of performing the various tasks described herein. As shown in FIG. 1, the key storage database 110c may be accessed by the analytics server 110a via one or more networks, but the key storage database 110c may also be accessed by the client device 140 and network nodes 120a-c to retrieve or confirm encryption keys or encryption key signatures. The key storage database 110c may be hosted on the same or different computing device functioning as the analytics server 110a and/or an analytics server 110a.

Network nodes 120a-c may represent one or more institutions relevant to the user's employment history (e.g., an employer, educational institution, and the like) and may host one or more blocks of the system blockchain. A network node 120a-c may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 120a-c are described as storing blocks of the blockchain in FIG. 1, other computing devices, such as an analytics server 110a, may host blocks of the blockchain. Each network node 120a-c locally stores an instance of the system blockchain in the storage medium of the system blockchain, and further executes a software application that instructs the network node 120a-c on generating and querying blocks within the locally stored blockchain instance.

In operation, a network node may generate new blocks on a locally stored instance of the system blockchain according to data received from an analytics server 110a or other network nodes 120a-c. In some instances, the analytics server 110a may update a local block instance stored on the analytics server 110a (e.g., within the system database 110b), and then instructs one or more of the network nodes 120a-c to update the blockchain stored in their local storage (e.g., local database). Moreover, the analytics server 110a may query the block instances of the system blockchain according to a block address stored in the system database 110b. When the analytics server 110a executes the query of the blocks on the system blockchain, the analytics server 110a may poll the network nodes 120a-c to determine the most recent data on the system blockchain (e.g., latest valid blockchain).

The analytics server 110a may ensure that the data at block is the desired data according to a voting mechanism encoded within the blockchain software executed by the network nodes 120a-c. Each network node 120a-c may receive the query for the block instance and block address, and return a response to the analytics server 110a indicating whether the block address contains the desired data. The analytics server 110a may select this method to combat possible fraud and to be certain that data in the blockchain is resistant to corruption, as each block instance on each network node 120a-c would need to be corrupted in the same way for a possible security breach. In this way, the analytics server 110a may also be prevented from acting on obsolete data. For instance, a network node 120a-c may attempt to modify information about a user's employment history. By modifying the information within the block instance, the hash value of said block instance may change, which would result in the block instance being disconnected from other block instances within the blockchain. Furthermore, when queried by the analytics server 110a, other network nodes may indicate that the modified block instance does not match a version of the data stored on their respective nodes. As a result, the analytics server 110a may determine that the modified block instance has been indeed tampered with. The analytics server 110a may then refuse to use the modified block instance.

A client device 140 may be any computing device allowing a participant/user to interact with analytics server 110a via analytics server 110a. The client device 140 may execute an Internet browser or local application that access the analytics server 110a in order to issue requests or instructions to the analytics server 110a to access the system blockchain (e.g., transmit instructions to the analytics server 110a). The client device 140 may transmit credentials from user inputs to the analytics server 110a, from which the analytics server 110a may authenticate the user and/or determine a user role. The client device 140 may comprise any number of input devices configured to receive any number of data inputs, including various types of data allowing for authentication (e.g., username, passwords, certificates, and biometrics). The client device 140 may be any computing device comprising a processor and non-transitory machine-readable storage medium allowing the client device 140 to perform the various tasks and processes described herein.

As an example of the client device 140 operation, the client device 140 may execute an Internet browser that accesses the analytics server 110a hosting an employment history website (or any other user interface) that allows the user to access and/or manage his/her employment history and resume). The user may then use the client device 140 to upload machine-readable computer files (e.g., PDF, DOC, XSL) containing employment information. The computer files may be stored into document records in a system database 110b, which may then be added to block instances of the system blockchain, where the block instances are accessible according to various blockchain rules. The client device 140 may issue queries or instructions to the analytics server 110a via the webpages generated by the analytics server 110a, which then instruct the analytics server 110a to query the block instances on the network nodes 120a-c, and, in some instances, perform various tasks, such as retrieving or updating data.

Figure 2:
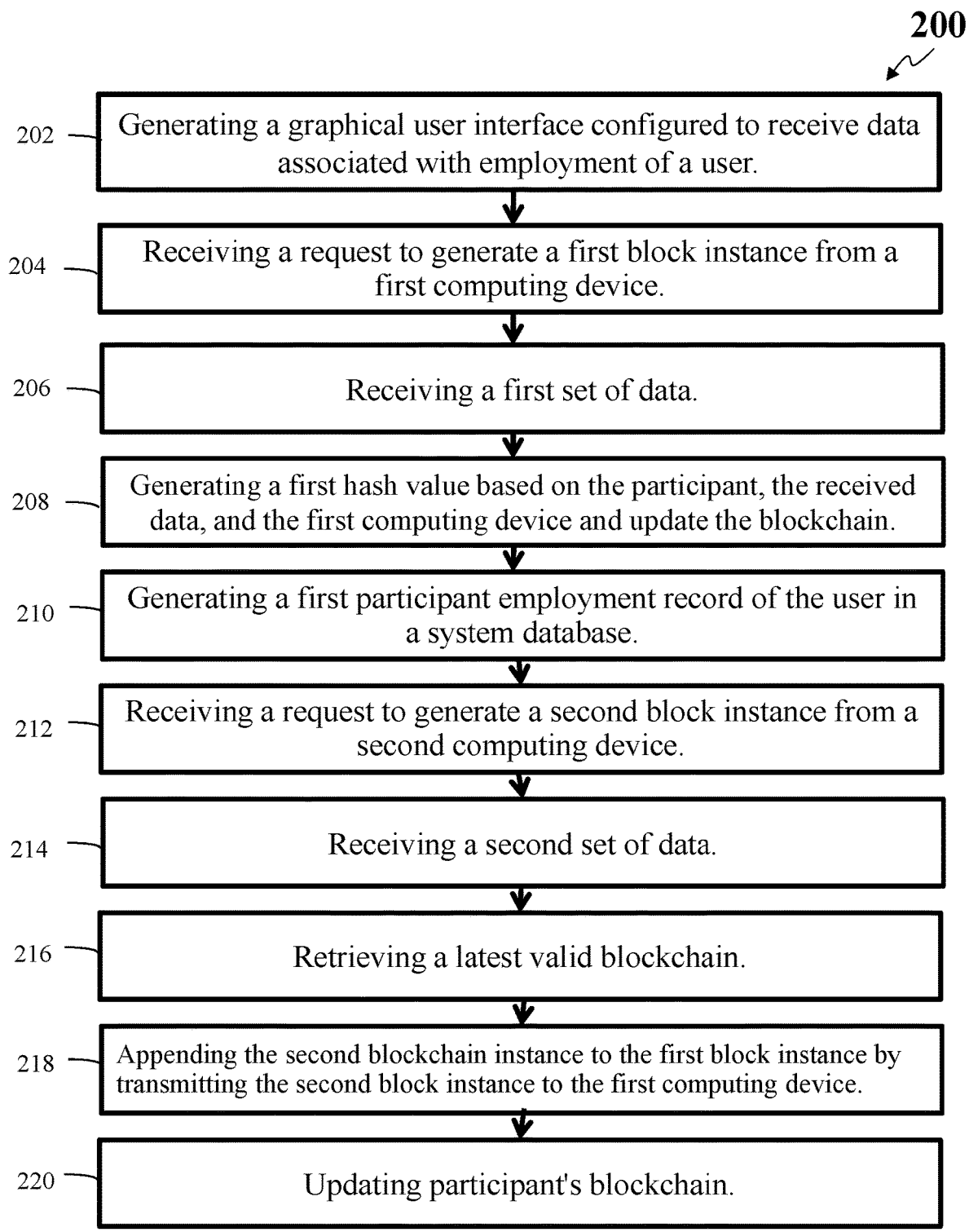
FIG. 2 illustrates a flowchart depicting operational steps for generating an intelligent employment-based blockchain, according to an embodiment.

FIG. 2 illustrates execution of an exemplary method 200 for generating an intelligent and secure electronic employment blockchain record, according to an exemplary embodiment. Other embodiments of executing the method 200 may comprise additional or alternative steps, or may omit some steps altogether.

At step 202, the analytics server may generate a graphical user interface comprising a plurality of input fields configured to receive data associated with employment of a participant. The analytics server may generate a graphical user interface in order to provide employment record services to variety of clients (e.g., employees, employers, and educational services). In an embodiment, the graphical user interface may be a website hosted by the analytics server, which is available to different clients. The purpose of said website may be to collect employment information, provide a platform to securely upload employment data, and/or possibly retrieve employment data from the website. The graphical user interface may act as an intermediary between different parties involved within a participant's career and may be a central and "one stop" place for adding, updating, and/or retrieving employment data. While the graphical user interface is described herein as a central management tool, neither the analytics server nor the graphical user interface deviates from the spirit of the distributed nature of the blockchain technology. The analytics server provides a management tool to reduce computational burden of keeping data records within various and sometimes-unrelated databases. As explained above, block instances may be stored in individual client databases (network nodes). Moreover, the distributed nature of data storage also provides a heightened data security.

At step 204, the analytics server may receive a first request to generate an employment record associated with a participant from a first computing device, wherein the blockchain is associated with employment of the participant. The analytics server may receive a request for a secure blockchain-based employment record associated with the participant. In some embodiments, an administrator associated with a computing device (e.g., an education institution, former or current employers, or another employee/peer) may log into a website hosted by the analytics server to generate or update the participant's employment record. In an embodiment, the administrator may be a customer or an independent contractor who wishes to leave a good review. In other embodiments, the administrator may be an employer or an educational institution wishing to indicate data associated with the participant's work or educational history.

At step 206, the analytics server may receive a first set of employment data associated with the participant. The administrator associated with the first computing device (e.g., a first network node) may use the GUI provided by the analytics server to input data regarding the participant. In an embodiment, the data received by the analytics server may be identification of the participant, education, salary, benefits, start data, and the like. The analytics server may also receive computer readable files related to the participant's employment. For example, the administrator operating the first computing device may upload a computer readable file (e.g., PDF, DOC, DOCX, XLS, and the like) related to the participant's employment, such as a PDF file of an employment award or XLS file of the participant's billable hours. The data received from the first computing device (e.g., the data to be added to the first block instance) may be a command or a computer executable file itself. For example, the data within the first block instance may comprise an instruction executable by the analytics server, the first computing device (or any other computing device or electronic source) to perform a set of tasks. For example, Company A may (instead of uploading each employment document individually) transmit an authentication token to the analytics server. Once the token is activated, it may permit an internal search within the database of company A and an automatic transmittal of all employment documents to the analytics server. Utilizing this functionality, company A may effectively provide authorization and access to the analytics server to search for all related documents within a database internal to company A.

In some configurations, the analytics server may automatically receive the first set of data from an electronic source with little or no human intervention. The analytics server may utilize an application-programming interface (API) to receive the participant's employment data. For example, an API locally installed on the first computing device and in direct communication with the analytics server, may query all relevant data (e.g., data associated with the participant) and transmit the data to the analytics server. Additionally or alternatively, the analytics server may periodically (e.g., in accordance to a predetermined period of time or based on received threshold from the first computing device) instruct the API to transmit participant's employment data back the analytics server. In other embodiments, the analytics server may generate and transmit an instruction to a database associated with the first computing device configured to query and receive the participant's employment data. For example, an employer may not need to update the information and request a new block instance every time an employee (e.g., participant) is promoted. Upon discovering a change of employment status, the analytics server may notify the first computing device to update the participant's information and/or automatically generate an instruction configured to receive the participant's new employment data.

Upon receiving the first set of data from the first computing device (or other sources associated with the first computing device), the analytics server may instruct a blockchain service application executed by the analytics server to create a block instance. In some embodiments, the first computing device may use a blockchain service application, which may not be executed by the analytics server. For example, the first computing device (or any other network node associated with the blockchain) may use a third party blockchain service application. In those embodiments, the analytics server may still have access to the blockchain and may still generate the hash values as described below. The first set of data (e.g., participant's employment data from the first computing device) may be stored onto a block instance and stored locally on a database associated with the first computing device, according to instructions of the blockchain service application and/or the analytics server. In some embodiments, the analytics server may duplicate and locally store a copy of the block instance within the system database.

At step 208, the analytics server may generate a first encrypted hash value based at least on one of the participant, the received first set of data, and/or the first computing device, according to a hashing algorithm. The analytics server may also update the first block instance with the first hash value, wherein the block instance is stored within the first computing device (or in a database associated with the first computing device). The analytics server may generate a hash value based on the network node (e.g., the first computing device), the participant (e.g., participant's identification or other identifying values associated with the participant), and/or the data received form the node (e.g., the first set of data). The hash value may be non-interactive and/or may have no secret/encryption keys that have to be managed by a central server or any other relying party (e.g., the analytics server or another central server). The hash value may be a cryptographic hash function. For example, in some embodiments, the hash value may be a string of alphanumerical values corresponding to the first set of data.

The analytics server may generate the hash value based on the received data from the first computing device. For example, data inputted in the one or more data fields of the graphical user interface may be hashed according to a predetermined hashing algorithm, combined together, and then stored onto the block instance. The analytics server may use this method to combat possible fraud because making the slightest change to the data within the blockchain may result in modification of the hash value, therefore an unauthorized modification of the data within a block instance may result in the block instance being disconnected from the blockchain by disconnecting the hash value of the subsequent blockchain instances (described below in FIG. 3). The analytics server may transmit the hash value to the first computing device and update the first block instance with the first hash value.

In some embodiments, the analytics server may hash portions of the first block separately to create intermediate hash values, generate a final hash value based on the intermediate hash values, and store the final hash value in the first block instance. Alternatively and/or additionally, the analytics server may hash the entire content of the first block instance to generate the final hash value and store the hash value in the first block instance (e.g., stored onto all the network nodes). Furthermore, the analytics server may store the hash value in an internal database to be verified or retrieved later.

At step 210, the analytics server may generate a participant employment record of the participant in a system database configured to store a plurality of participant employment records, the participant employment record comprising one or more data fields containing the first set of data. The analytics server may store data associated with the first block instance within the system database (as described in FIG. 1). For example, the analytics server may record the hash value and/or the first set of data associated with the participant within the system database. For example, the analytics server may keep a record of which network node has access to or has stored which block instance. The analytics server may use the stored data to access the network node and to retrieve data within one or more block instances stored within the network node (or a database associated with the network node).

At step 212, the analytics server may receive a second request to update the employment record by generating a second block instance for a second computing device. The analytics server, similar to step 202, may receive a request to update participant's employment blockchain (e.g., generate another block instance and append to the participant's employment blockchain). In an embodiment, a second administrator utilizing a second computing device may log in the website hosted or otherwise associated with the analytics server and request to add information regarding the participant's employment. The second computing device (e.g., second network node) may be associated with a second employer, another peer/customer, or another educational institution offering services to the participant. For example, upon the employer starting a new job the new employer may utilize services rendered by the analytics server to input new employment data.

At step 214, the analytics server may receive a second set of employment data associated with the participant from the second computing device. As explained above, the analytics server may, similar to step 204, receive the participant's employment data from the second computing device (e.g., second node). In an embodiment, the data received by the analytics server may include identification of the user, education, employee salary, benefits, start date, and the like. As described above, the data received from the second computing device (e.g., the data to be added to the second block instance) may be a command a computer function itself. For example, the data within the second block instance may comprise an instruction executable by the analytics server, the second computing device, or any other computing device or electronic source to perform a set of tasks. The analytics server may also receive computer readable files related to the user's employment. For example, the administrator operating the first computing device may upload a computer readable file (e.g., PDF, DOC, DOCX, XLS, and the like) related to the user's employment, such as a PDF file of an employment award or XLS file of the user's billable hours. In some embodiments, the analytics server may utilize an application-programming interface (API) to receive the user's employment data. For example, an API locally installed on the first computing device and in direct communication with the analytics server may query all relevant data (e.g., data associated with the user) and transmit the data to the analytics server.

As explained above, the analytics server may also automatically receive the first set of data from an electronic source with little or no human intervention. The analytics server may utilize an application-programming interface (API) to receive the participant's employment data. For example, an API locally installed on the second computing device and in direct communication with the analytics server may query all relevant data (e.g., data associated with the user) and transmit the data to the analytics server. The analytics server may periodically (e.g., in accordance to a predetermined period of time or based on received threshold from the second computing data) instruct the API to transmit participant's employment data. In other embodiments, the analytics server may generate and transmit an instruction to a database associated with the second computing device configured to query and receive the participant's employment data. For example, an employer may not need to update the information and request a new block instance every time an employee (e.g., participant) is promoted. Upon discovering a change of employment status, the analytics server may notify the second computing device and automatically generate a new blockchain instance.

At step 216, the analytics server may retrieve the latest valid blockchain, wherein the valid blockchain is confirmed by the first computing device. The analytics server may also generate a second hash value identifying the participant, the second set of data, and the second computing device, according to a hashing algorithm. In some implementations, to deploy the second block instance to the participant's employment blockchain, the analytics server may poll the network nodes associated with the blockchain instances within the participant's employment blockchain and determine the latest valid blockchain. The analytics server may use a predetermined threshold for determining the latest valid blockchain. In an embodiment, the analytics server may contact every node associated with the blockchain and request to receive each node's latest valid blockchain. Upon receipt of the latest valid blockchain of each network node (including the hash values for each block instance), the analytics server may match the received hash values from each node with each other. Upon the number of positive matches satisfying a threshold, the analytics server assumes that the received blockchain is the latest valid blockchain. For example, the analytics server may query the network nodes (e.g., the first computing device) for the latest blockchain instance. If the analytics server receives the same block instance (e.g., hash values) from 50+ percentages of the network nodes, the analytics server may determine that the received blockchain is the latest valid blockchain. In some embodiments, the analytics server may generate and transmit an instruction to all the network nodes associated with other block instances within the employment blockchain and notify the parties that a validation process has been initiated and that the network node's participation is requested.

The predetermined threshold may correspond to a level of data integrity. For example, a higher threshold ensures that more network nodes have approved the latest blockchain. Thus, a higher threshold corresponds to higher data integrity. In some embodiments, the analytics server may receive the level of integrity (e.g., the threshold to determine the latest valid blockchain) from the client device (e.g., the participant), the first computing device, the second computing device, or any other network node or computing device associated with the blockchain. The analytics server may use a higher predetermined threshold for data requiring a higher level of security and integrity, for example, recognition point transfers or sensitive recommendation/data transfer. While the present embodiment only describes two computing device for the simplicity purposes, the participant's employment blockchain may include several computer nodes and the analytics server may poll all the nodes associated with a blockchain to receive the latest valid blockchain.

At step 218, the analytics server may append the second block instance to the first block instance by transmitting the second block instance to the first computing device. The analytics server may append the second block instance to the latest valid blockchain. The analytics server may also generate second hash value using the user's identification, data received from the second computing device (e.g., second network node), and/or the identification of the second node. The analytics server may generate the second hash value based on the network node (e.g., the second computing device), the participant (e.g., participant's identification or other identifying values associated with the participant), and/or the data received form the node (e.g., the second set of data). The second hash value may be non-interactive and/or may have no secret/encryption keys that have to be managed by a central server or relying party (e.g., the analytics server or another central server).

The second hash value may be a cryptographic hash function. For example, in some embodiments, the second hash value may be a string of alphanumerical values. The analytics server may generate the second hash value based on the received data from the second computing device. For example, data inputted in the one or more data fields of the graphical user interface may be hashed according to a predetermined hashing algorithm, combined together, and then stored to the blockchain instance. As explained above, the analytics server may hash portions of the second block instance separately to create intermediate hash values, generate a final hash value based on the intermediate hash values, and store the final hash value in the second block instance. Additionally or alternatively, the analytics server may hash the entire content of the block instance to generate the final hash value and store the hash value in the second blockchain instance.

The second hash value may also be, wholly or partially, based the first hash value. In some embodiments, the analytics server may generate the second hash value using the first hash value (e.g., associated with the first computing device and generated in step 208). In those embodiments, the second hash value associated with the second block instance may include or be based on the first hash value. The analytics server may append the second block instance to the first block instance (of the latest valid blockchain) by transmitting the second hash value and a block address associated with the second block instance to the first computing device. Simply put, the analytics server may transmit the latest block instance to all the nodes associated with the blockchain. The hash values, which are interrelated, ensure the connectivity of the second block instance to the preceding block instance of the latest valid blockchain (e.g., the first block instance).

At step 220, the analytics server may update the second block instance with the second hash value, wherein the second block instances stored within the second computing device. In some instances, the analytics server may generate instructions (utilizing the blockchain services hosted by the analytics server) and update all the nodes associated with the hash value associated with the second blockchain instance. The analytics server may update the participant's employment blockchain by transmitting the newly generated block instance to all the network nodes associated with the employment blockchain. For example, the analytics server may transmit the second block instance to the first node and the first block instance to the second node. By transmitting the block instances, the analytics server ensures that all the network nodes possess the latest valid block instance or block addresses associated with the latest valid block instances within the blockchain.

In some embodiments, the analytics server may generate a blockchain address for each block instance. The analytics server may utilize private and public keys for each network node (or users operating the network nodes) to encrypt a portion (or all) the data for one or more block instances and create a blockchain address. A key may be defined as a secret code, which allows the network node associated with each block instance to prove ownership. The analytics server may generate a blockchain address for one or more block instances. A blockchain address allows a third party to view the content of the blockchain. For example, a recipient of a blockchain address may access the analytics server, provide the blockchain address, and upon verification, view a portion or all of blockchain data content. The blockchain address may be an alphanumerical string that indicates which portions of the blockchain are accessible by the recipient. In some configurations, the blockchain address may be a uniform resource locator directing the recipient to a webpage, where upon proper authentication, the recipient is able to view the blockchain data content. As described above, and further described in FIG. 6, the analytics server may encrypt some or all the data based on a recipient's public key. When the recipient enters his/her private key and the blockchain address, the analytics server may decrypt the data based on the recipient's private key.

Even though all network nodes may possess the blockchain, not all network nodes may access the data within the blockchain. The analytics server may generate a customized encryption based on a network node's selection of data. For example, the administrator using the second computing device may designate the information within the second blockchain as public. In those embodiments, the analytics server may transmit the data to the all the other network nodes associated with the blockchain (e.g., first computing device) or make the data within the second blockchain readily available to all the nodes associated with the blockchain or any other computing device in possession of the blockchain address. All network nodes may freely share the public information. On the other hand, a network node may designate a portion of the data in a block instance as private. In those embodiments, the analytics server may encrypt the data using the network node's public key. The above-mentioned encryption allows the data to be transmitted and stored onto all the network nodes within the blockchain. However, only the network nodes having proper authorization to decrypt the data may view and access the encrypted data. In this way, sensitive employment data (e.g., social security number, health record, and the like) may be included within the blockchain without compromising the participant's privacy.

The analytics serve may also utilize the multiple private or public keys as an authentication (e-signature) method to illustrate individuals who have accessed or performed an action within the blockchain. For example, the analytics server may generate a distinct and unique private key for each administrator associated with each network node. The analytics server may generate such key using the administrator's unique identification stored in the system database (or received from a network node). The analytics server may also require the administrator to input their unique private key in an input field within the graphical user interface provided by the analytics server in order to perform any actions within the blockchain. The analytics server may, upon performing the requested action, store the unique private key and/or a timestamp indicating the administrator, the requested actions, and the time performed into the block instance. This information may be public and visible to other network nodes. For example, another network node may be able to examine each public block instance and determine the administrator who generated said block instance or modified/updated it. In some embodiments, the analytics server may be configured to communicate with other distributed ledger/blockchain managers (not shown) in a network of blockchains to provide for consensus or other safeguards that ensure that data being added to or otherwise being altered in the distributed ledger is allowable.

Figure 3:
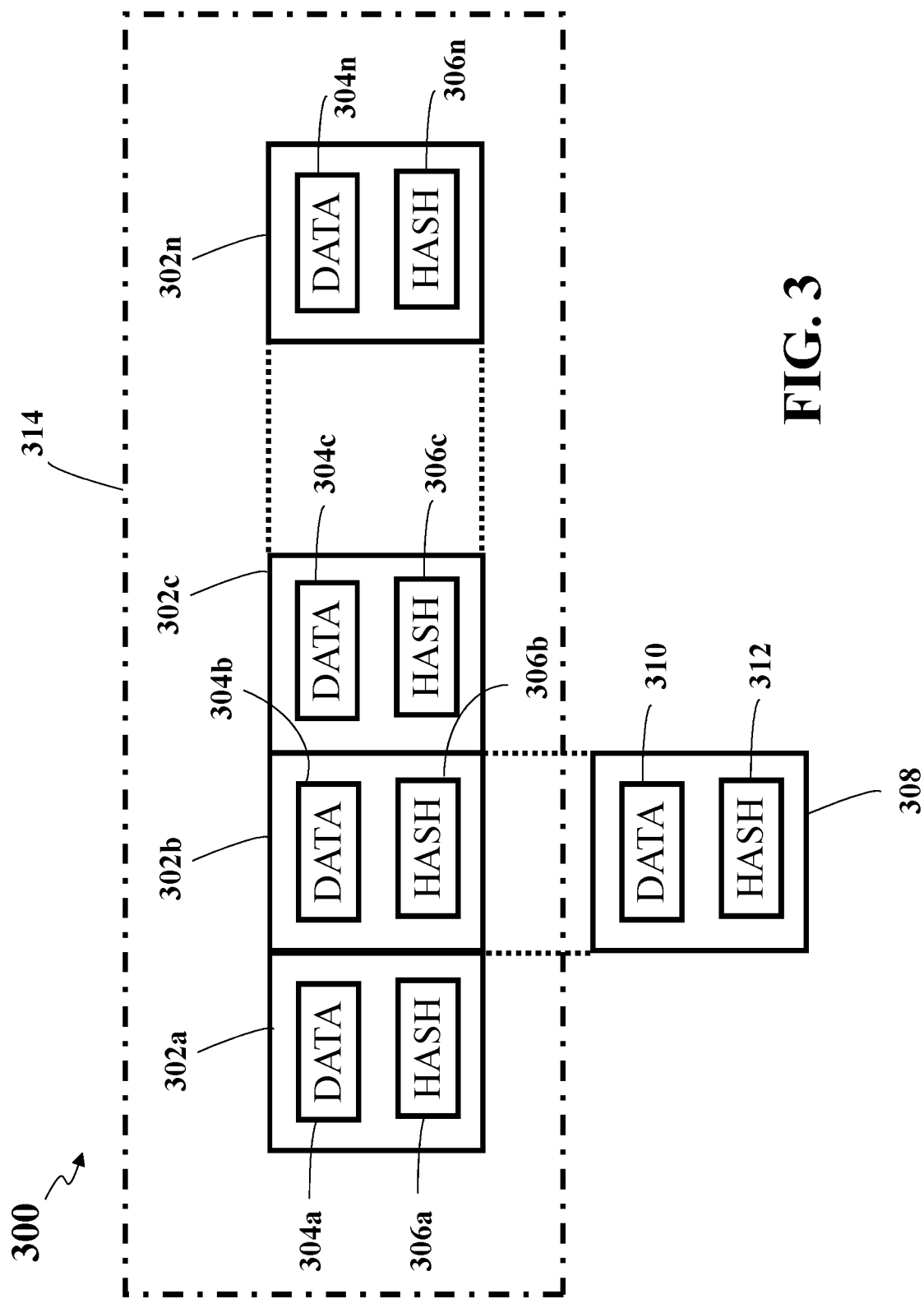
FIG. 3 graphically illustrates an example of appending multiple block instances, according to an embodiment.

Referring now to FIG. 3, an example of a participant's employment blockchain comprising different block instances is illustrated. As depicted in FIG. 3, a blockchain 314 comprises block instances 302a-302n (collectively 302) may include data 304a-304n (collectively 304) that enables information, such as employment data, machine-readable code/documents, and other metadata associated with a participant. Also contained in the blockchain instances are hash values 306a-306n (collectively 306) that are used to link each of the block instances to the preceding blockchain instances or blockchain formed by the preceding blockchain instances, as understood in the art.

As explained above, the analytics server may generate (or instruct a blockchain service to generate) the block instance 302a. The analytics server may receive data 304a from the first computing device (e.g., first node) via GUI provided by the analytics server on the first computing device/network node (steps 202-206 of FIG. 2). For example, an administrator using the first computing device may log in a website hosted or otherwise associated/managed by the analytics server and transmit data 304a to the analytics server. Upon generation of block instance 302a, the analytics server may generate hash value 306a based on the data 304a, the first node (e.g., the first computing device), identifier information (e.g., time stamp and/or geolocation), and/or an identification of the participant (e.g., step 208 of FIG. 2).

The analytics server may also generate (or instruct a blockchain service to generate) the block instance 302b. The analytics server may receive data 304b from a second computing device (e.g., second network node) via GUI provided by the analytics server on the first computing device (steps 212-214 of FIG. 2). For example, an administrator using the second computing device may log in a website hosted or otherwise managed by the analytics server and transmit data 304b to the analytics server. The analytics server may also generate hash value 306b based on the data 304b, the second network node (e.g., identifier information such as time stamp, geolocation, and/or a computing device identifier), and/or a reference to the system database associated with the analytics server.

The hash value 306b may also include information regarding the hash value 306a. The analytics server may incorporate the hash value 306a into the hash value 306b in order to append the block instance 302b to the block instance 302a (step 218 of FIG. 2). The analytics server may subsequently poll all the nodes in order to ensure the highest integrity of the blockchain by appending the latest block instance to the latest valid blockchain instances. Using this method blockchain instances within the block chain 314 may be appended to the preceding blockchain instance. The analytics server may generate block chain instance 302c-n using the same methods explained above in order to continuously update blockchain 314. As depicted, block instances 302a, 302b, 302c, and 302n are connected because of synchronization of hash values 306a, 306b, 306c, and 306n.

In some configurations, additional information, such as an identifier associated with network nodes adding or updating the data could also be included within the blockchain or incorporated within the hash value. As an example, if a network node modifies or adds any data to the blockchain, an identifier associated with the computing device who contributed to creating or modifying the data may be included in the respective block. In some embodiments, the identifier may include a time stamp (e.g., data regarding the time of data modification or creation) and/or a geolocation (e.g., data regarding the location within which the data modification or creation has occurred or a has value based on the user's geo-location). The identifier may also be incorporated within the hash value and may be used by the analytics server as a part of the hashing algorithm. Such identification information may be used as a veracity scale factor that the information is true and accurate.

The analytics server may also transmit the blockchain instances to all the network nodes within the blockchain in order to preserve the integrity of the blockchain. For example, the analytics server may transmit the hash value 306c (e.g., the hash value generated for block instance 302c based on data 304c received from a third node) to the first node (e.g., the first computing device storing the block instance 302a) and the second node (e.g., the second computing device storing the block instance 302b).

Modification of data within a block instance may disconnect that block instance from the blockchain. The analytics server may use this method to combat possible fraud or unauthorized modification of the data within blockchain instances. For example, if the second administrator using the second computing device modifies data 304b within block instance 302b, the hash value 306b will also be modified. As explained above the hash value 306b may be based on (or at least partially based on) data 304b; therefore if data 304b is modified to data 310, hash value 306b will also be modified to hash value 312. Modification of hash value 306b to hash value 312 may break the link between block instance 302b and block instance 302c because hash value 306c is at least in part generated based on hash value 306b.

The analytics server may generate a new block instance 308 including the modified data 310 and a newly generated hash value 312. However, the analytics server may not attempt to append or include the newly generated block instance 308 within the blockchain 314. The analytics server may append block instance 308 to block instance 302b by linking hash value 312 to hash value 306b (e.g., generating the hash value based (at least partially) on hash value 306b. In operation, the analytics server may encounter such modification when an employer desires to update or insert additional material the participant's employment blockchain. For example, a second network node (e.g., the network node owner of block instance 302b) may be a previous employer to the participant. The second network node may desire to add an exit review to the participant's employment blockchain. Since the analytics server protects the integrity of the employment blockchain, the analytics server may not allow the second network node to simply modify data 304b.

In some configurations, the analytics server may provide the second network node the option to generate a new block instance (e.g., the block instance 308) and append to the second network node's previous block instance (block instance 302b). The analytics server may also transmit the block instance 308 to all the network nodes within blockchain 314; therefore, while all the network nodes within the blockchain 314 are aware of the block instance 308, they are also aware that block instance 308 contains updated and modified data. In some embodiments, the analytics server may poll all the existing network nodes within the employment blockchain before appending the block instance 308 to block instance 302b.

Figure 4:
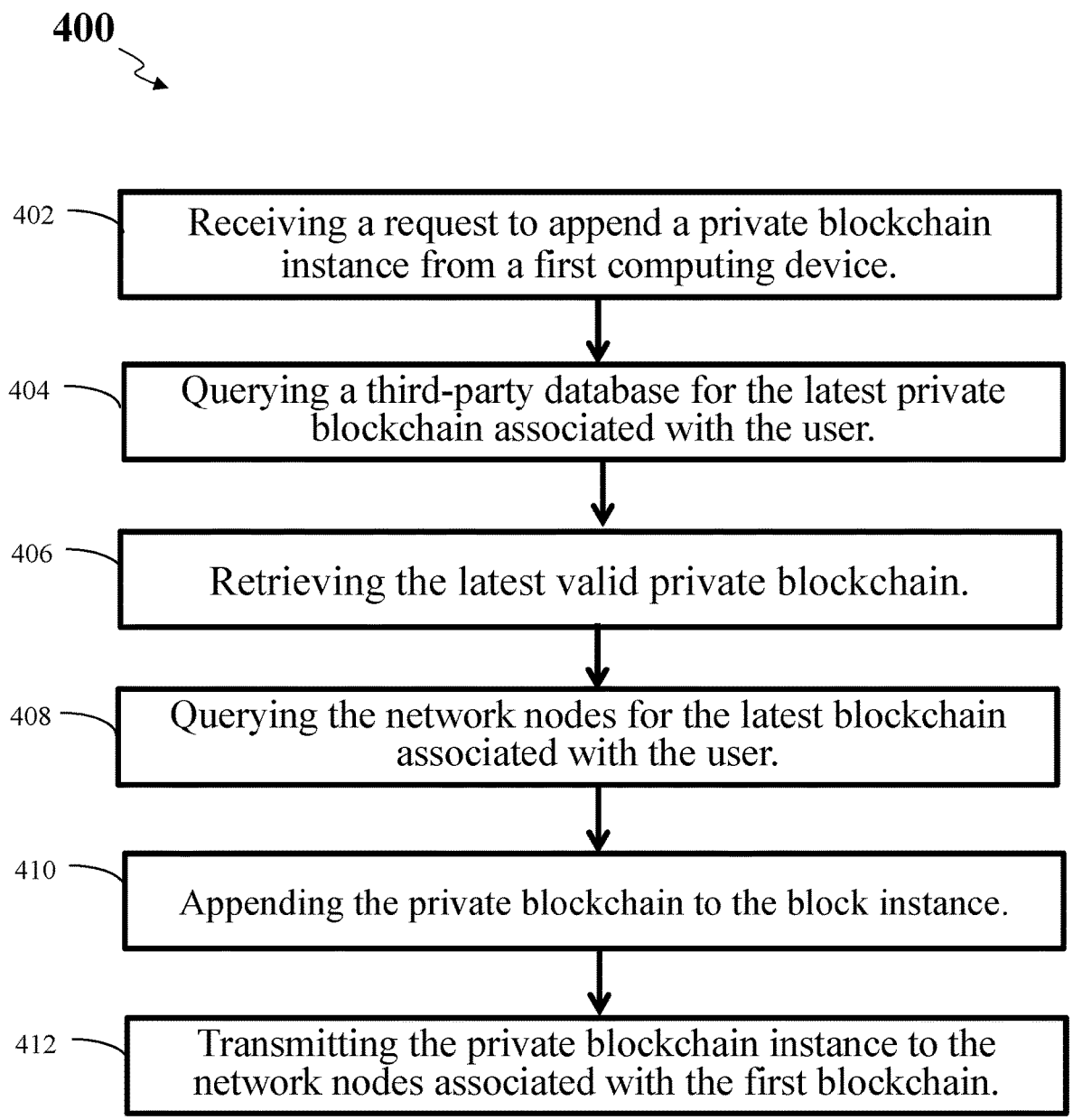
FIG. 4 illustrates a flowchart depicting operational steps for retrieving and appending multiple blockchains, according to an embodiment.

FIG. 4 illustrates execution of an exemplary method 400 for retrieving and appending a private electronic employment blockchain to an existing (or new) employment blockchain, according to an exemplary embodiment. Other embodiments may comprise additional or alternative steps, or may omit some steps altogether.

At 402, the analytics server may receive a request to append a private blockchain to an existing blockchain. As explained above, the analytics server may generate a graphical user interface in order to provide employment record services to variety of clients (e.g., employees, employers, and educational services). In an embodiment, the graphical user interface may be a website hosted by the analytics server, which is available to different clients. The purpose of said website may be to collect employment information, provide a platform to securely upload employment data, and/or possibly retrieve employment data from the website. The graphical user interface may act as an intermediary between different parties involved within a participant's career and may be a central and "one stop" website for adding, updating, and/or retrieving data. While the described graphical user interface is described herein as a central management tool, neither the analytics server nor the graphical user interface deviate from the spirit of the distributed nature of the blockchain technology. The analytics server provides a management tool to reduce computational burden of keeping record within different and unrelated databases; blockchain instances may be stored in individual client databases (network nodes).

The analytics server may receive a request from a first computing device to append a private blockchain to an existing or new employment blockchain maintained by the analytics server. A private blockchain is a blockchain, which is maintained and managed by a server other than the analytics server, which may only accept new information and block instances from certain designated computing devices. A non-limiting example of a private blockchain may include an internal company blockchain. For example, a company may generate and maintain a blockchain configured to only accept information or generate new block instances from computing devices within that particular company. In an embodiment, the analytics server may receive the request from a former employee of a company, which utilizes a private blockchain.

The analytics server may receive a request from a first computing device utilized by the employee. The employee may desire to attach his/her private blockchain to his/her employment blockchain managed by the analytics server. Employee's employment blockchain may be managed by the analytics server (as described in FIG. 2 and FIG. 3). Employee's private blockchain may contain information associated with specific work-related data, which may not be made public by the employee's former employer. For example, the private blockchain may contain recommendations, writing samples, trophies and awards, and other pertinent information, which the employee may desire to catalog into his employment blockchain maintained by the analytics server. In an embodiment, the employee's employment blockchain includes a block instance associated with the former employer, however does not include the private blockchain. For example, an employment blockchain for a participant may indicate that the participant was employed by Company A but not include any accolades from company A because those accolades are only stored on Company A's internal blockchain.

At 404, the analytics server may query a third party database for the latest valid blockchain associated with the user. The analytics server may identify the network node associated with the private blockchain and query the network node or a database associated with the network node by sending an instruction configured to receive the private blockchain from the network node/database. For example if the private blockchain is associated with network node A, the analytics server may generate and transmit the instruction to network node A. The analytics server may identify the network node associated with the private blockchain by using the identification received in step 402. The analytics server may transmit said instruction to the network node or directly to a database associated with the network node and receive the private blockchain associated with the employee.

At 406, the analytics server may receive the latest valid private blockchain associated with the user. The analytics server may query the network node to request the latest valid private blockchain. In some embodiments, the analytics server may generate and transmit an instruction to the network node to poll all the internal/private network nodes and receive the latest valid private blockchain. In other embodiments, the analytics server may transmit an instruction to the network node to identify the private network nodes, generate, and transmit another instruction directly to the private network nodes in order to receive the latest valid private blockchain. Private network nodes, as used herein, are internal nodes within the private blockchain system, which possess each private block instance. For example, a private blockchain belonging to Company A may comprise three private block instances associated with accounting, human resources, and payroll. In this example, each of accounting, human resources, and payroll may represent a private network node (e.g., are associated with block instances that are private). The analytics server may contact each of the above-mentioned three private network nodes and query for the latest valid private employment blockchain. In some configurations, the analytics server may only contact Company A's server and retrieve the private blockchain.

At 408, the analytics server may query for the latest valid employment blockchain associated with the user. As explained above, the analytics server may poll the network nodes associated with the employment blockchain instances within the participant's employment blockchain and determine the latest valid blockchain. The analytics server may use a predetermined threshold for determining the latest valid blockchain. For example, the analytics server may query the network nodes for the latest blockchain instance. If the analytics server receives the same blockchain from 51% of the network nodes, the analytics server may determine that the received blockchain is the latest valid blockchain. The predetermined threshold is set upon the level of integrity required for the data and instructions stored in the analytics server or the blockchain. In some embodiments, the analytics server may receive the level of integrity (e.g., the threshold to determine the latest valid blockchain) from the participant, the first computing device, or the second computing device. The analytics server may use a higher predetermined threshold for data requiring a higher level of security and integrity, for example, electronic money transfers. While the present embodiment only describes two computing device for the simplicity purposes, the participant's employment blockchain may include several computer nodes.

At 410 and 412, the analytics server may append the private blockchain to the employment blockchain by transmitting the private blockchain to the network nodes associated with the employment blockchain. The analytics server may generate a hash value for the private blockchain based on the hash value of the identified block instance and append the private blockchain to the specific block instance associated with the network node associated with the private blockchain and the block instance (See FIG. 4). The analytics server may also replicate the private blockchain or generate a link to the private blockchain (depending on the network node associated with the private blockchain). The analytics server may also transmit the private blockchain (block instances within the private blockchain) to all the network nodes associated with the employment blockchain.

Figure 5:
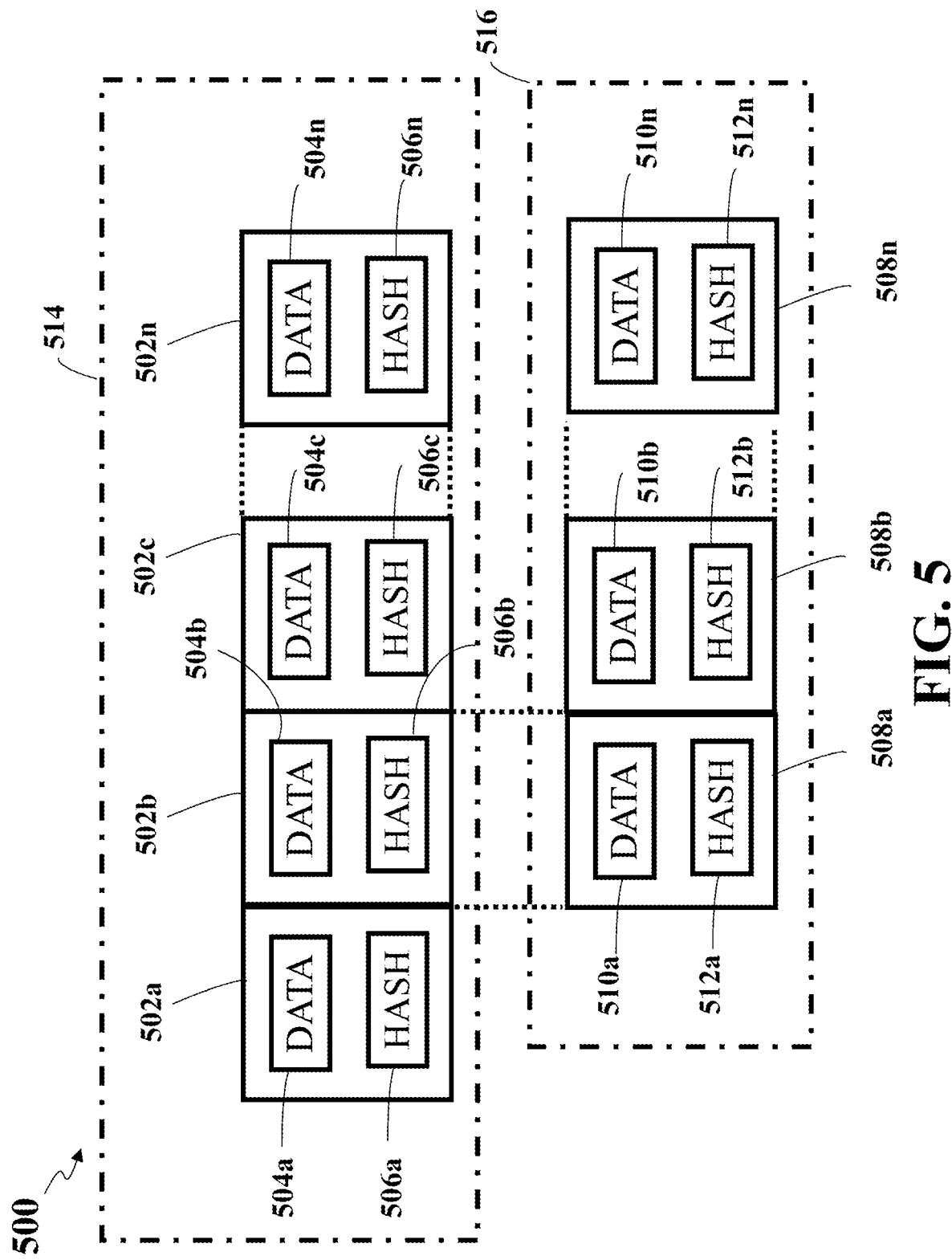
FIG. 5 graphically illustrates an example of appending a private blockchain to an employment blockchain, according to an embodiment.

Referring now to FIG. 5, an example of appending a private blockchain to a participant's employment blockchain is illustrated. As depicted in FIG. 5, an employment blockchain 514 comprises block instances 502a-502n (collectively 502) that include data 504a-504n (collectively 504) that enables information, such as employment data, machine-readable code/documents, and other metadata associated with a participant is illustrated. Also contained in the blockchain instances are hash values 506a-506n (collectively 506) that are used to link each of the block instances to the preceding blockchain instances or blockchain formed by the preceding blockchain instances, as understood in the art.

As explained above, private blockchain 516 may be associated with a network node within the employment blockchain 514. In some instances blockchain 516 may not be accessible to any of the network nodes within the blockchain 514. The employment blockchain 514 may comprises block instances (e.g., block instances 502a-n) relating to employment of a participant. Private blockchain 516 may belong to the network node associated with the block instance 502b. For example, network node associated with the block instance 502b may be a former employer (e.g., company A), which provides a limited, internal, and private blockchain within company A. As depicted within this embodiment, the analytics server may receive a request to append private blockchain 516 to the employment blockchain 514. The participant may receive this request after the participant has left company A and now desires to update his resume using data included within the private blockchain 516.

As depicted in FIG. 5, the private blockchain 516 comprises block instances 508a-508n (collectively 508) that include data 510a-510n (collectively 510) that enables information, such as employment data, machine-readable code/documents, and other metadata associated with a participant is illustrated. Also contained in the blockchain instances are hash values 512a-512n (collectively 512) that are used to link each of the private block instances to the preceding blockchain instances. Each block instance within the private blockchain 516 (e.g., private block instances) may be associated with different private network nodes within the blockchain system provided by the network node associated with block chain 502b (e.g., Company A). For example private block instance 508a may belong to (e.g., be stored locally at a database associated with) private network node A and private block instance 508b may belong to private network node B.

Upon receiving the request from the participant's computing device, the analytics server may generate and transmit an instruction configured to receive the private blockchain 516 from the network node associated with block instance 502b. Upon transmission of the instruction, the analytics server may receive the private block chain 516. In some other embodiments, the analytics server may query and identified the associated network nodes and query them directly to retrieve the blockchain. The analytics server may append the private block chain 516 to the block instance 502b and generate a parallel or ancillary blockchain. As depicted in FIG. 5, private blockchain 516 is parallel to employment blockchain 514.

In some embodiments, the analytics server may append the private blockchain 516 to the block instance 502b by generating a hash value 512a that is linked (e.g., partially based on) to the hash value 506b. The analytics server may also transmit a notification to the network nodes associated with each block instance within the employment blockchain that a new parallel blockchain has been generated and append to the original blockchain. In some embodiments, the analytics server may transmit the content of the private blockchain to all the networks nodes within the employment blockchain 514. The analytics server may also first identify the public and private information within the private blockchain 516 and transmit/share the data within the private blockchain 516 with in accordance to this designation. In some configurations, the private blockchain 516 may not have a corresponding block instance within the blockchain 514 (e.g., 502b). In those embodiments, the analytics server may create a new block instance within blockchain 514 and append the blockchain 516 to the newly created block instance.

Figure 6:
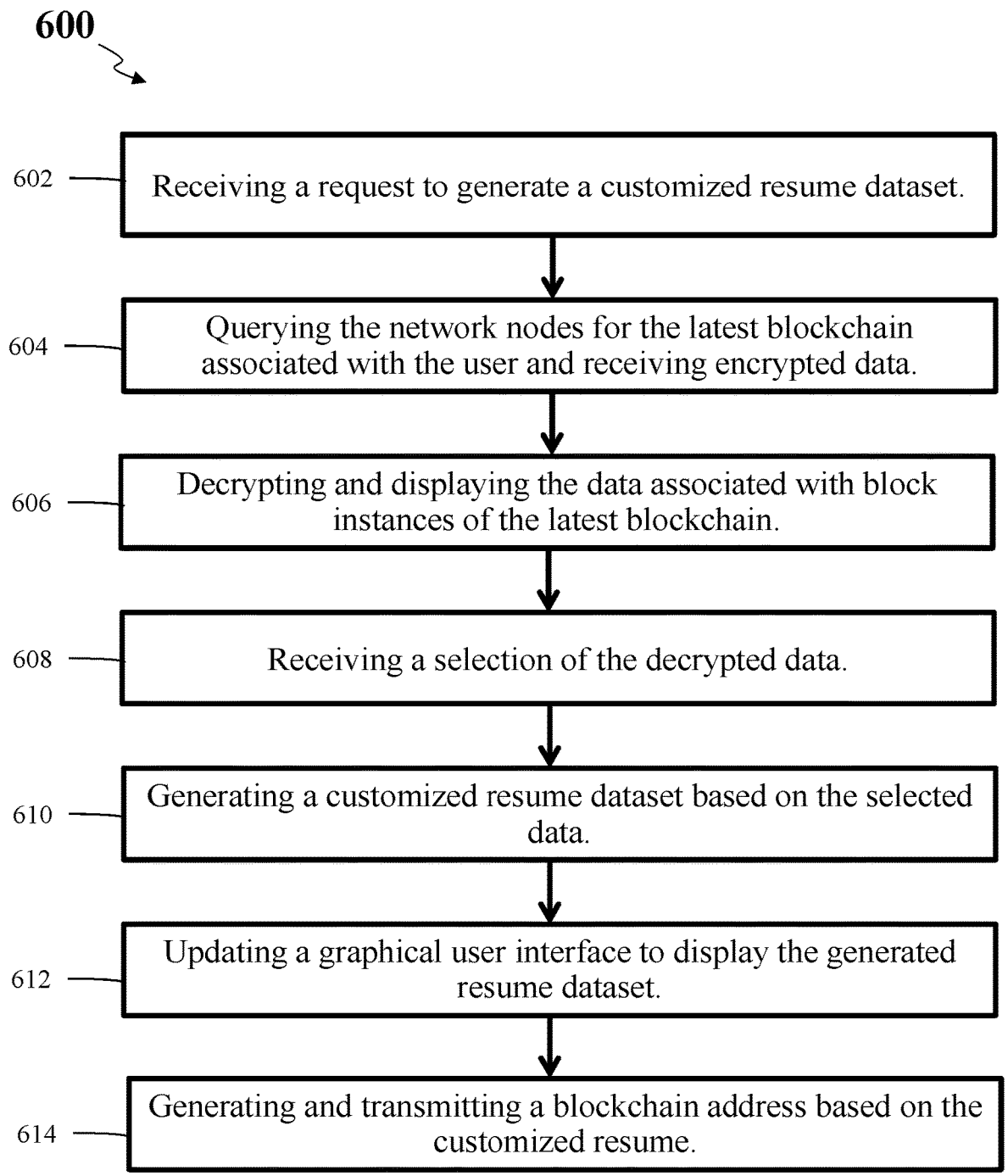
FIG. 6 illustrates a flowchart depicting operational steps for generating a customized blockchain-based resume, according to an embodiment.

FIG. 6 illustrated execution of an exemplary method 600 for generating an intelligent and customized resume based on an employment blockchain, according to an exemplary embodiment. Other embodiments may comprise additional or alternative steps, or may omit some steps altogether.

At step 602, the analytics server may receive a request to generate a resume dataset. The analytics server may generate a graphical user interface comprising a plurality of input fields configured to receive data associated with employment and a customized participant resume. The analytics server may generate a graphical user interface in order to provide employment record and customized resume services to variety of clients. In an embodiment, the graphical user interface may be a website hosted by the analytics server, which is available to different clients. The purpose of said website may be to collect employment information, provide a platform to securely upload employment data, generate a customized resume based on an employment blockchain, and transmit the resume to a potential employer. While the described graphical user interface is described herein as a central management tool, neither the analytics server nor the graphical user interface deviate from the spirit of the distributed nature of the blockchain technology. The analytics server provides a management tool to reduce computational burden of keeping record within different and unrelated databases; blockchain instances may be stored in individual client databases (network nodes).

The analytics server may receive the request to generate a customized resume from a computing device operated by the participant. In some embodiments, the analytics server is associated with an institution providing employment management services to the participant and or his/her employers. In an embodiment, a participant associated with a computing device may log into a website hosted by the analytics server to generate a customize resume. The participant may use the GUI provided by the analytics server to input data regarding the participant. The analytics server may use this information to identify an employment blockchain associated with the participant. For example, by logging in, the participant may provide a unique key associated with his employment blockchain. The analytics server may identify the participant's employment blockchain based on the participant's credentials or other received identifications.

At step 604, the analytics server may query the network nodes for the latest valid blockchain. As explained above, the analytics server may poll the network nodes associated with the blockchain instances within the participant's employment blockchain and determine the latest valid blockchain. The analytics server may receive a blockchain from each node (including hash values for each block instance within the blockchain) and compare the hash values. Upon the number of positive matches satisfying a threshold, the analytics server may assume that the received blockchain is accurate. For example, and referring back to FIG. 5, the analytics server may receive a block 302a from the first computing device (first network node and the true content owner of the block instance) and a copy of the same block instance from the second computing device and the third computing device. If the hash value of the block instances of the received blocks match, then the analytics server may assume that the received block instance are truly the latest and most valid of the blockchain instances. The analytics server may perform this query and evaluation for every block instance (or a predetermined number or ratio of the block instances) within the blockchain. The analytics server may use a predetermined threshold for determining the latest valid blockchain. For example, the analytics server may query the network nodes for the latest blockchain instance. If the analytics server receives the same data (e.g., hash values) from 51% of the network nodes, the analytics server may determine that the received blockchain is the latest valid blockchain.

Upon determining the latest valid blockchain, the analytics server may then query each network node and transmit an instruction to receive the content of the network node's block. For example, if network node A is the content owner of the block instance A, the analytics server may query to receive the data within the block instance A. In an embodiment, the data within block instance A may be locally stored or stored in a database associated with the network node A. Upon receiving the data within block instance A, the analytics server may decrypt the data using a variety of decryption methods. In some embodiments, data received from one or more network nodes may be encrypted. If the data is encrypted, the analytics server may first decrypt the data. For instance, the analytics server may use a private or public key (stored in the key storage database, such as the key storage database 110C) to decrypt the data received. In one embodiment, the analytics server may repeat this process to access all the data within the blockchain.

At step 606, the analytics server may query each network node to receive the data corresponding to the latest valid blockchain from each network node, decrypt the received data using a decryption key, and display the data within the block instances within the participant's employment blockchain. The analytics server may capture the data within each block instance within the participant's latest valid employment blockchain. The analytics server may also generate and transmit an instruction to the participant's computing device to display the data captured from the participant's employment blockchain. For instance, the analytics server may update the GUI provided on the participant's computing device to display the data captured from the participant's latest valid employment blockchain. The analytics server may organize the data displayed based on one or more pre-determined criteria. The analytics server may group and display the data based on the network nodes, block instances, and the like. For example, the analytics server may display all the educational data within the participant's latest valid blockchain together. The analytics server may also display the data from each network node separately.

At step 608, the analytics server may receive a selection of the decrypted data displayed from the computing device associated with the participant. The analytics server may receive attributes of the customized resume from the participant's computing device. In other words, the participant may select which information to include in the customized resume dataset. In one embodiment, the analytics server may provide an option to the participant to select data (to include in the customized resume) while displaying the data in step 606. For example, the user, while reviewing the data within the participant's latest valid employment blockchain, may click on information to be included in the customized resume.

At step 610, the analytics server may generate a customized resume dataset based on the selected data. The analytics server may generate a dataset comprising the data, which complies with the selected data received from the participant's computing device in step 608. The analytics server may receive participant's resume preferences (e.g., include all the educational information, do not include any information from employer A, and the like). The analytics server may generate the resume dataset and store it within an internal or external database comprising data field configured to store this plurality of data. The participant may only customize his/her own reflection of the data within the employment blockchain. For example, a participant who has extensive programming experience may have a blockchain with several block instances related to his programming expertise (e.g., recognitions and the like regarding his programming); however the participant may now desire to highlight his managerial skills. The participant, in that example, may choose his customized resume dataset to reflect all his managerial skills. However, the participant may not modify or customize the information within the block instances, as this will create a separation of the modified block instance from the blockchain. In some embodiments, the potential employer or the receiver of the customized resume may still access the participant's employment blockchain and review the participant's data in its entirety.

At step 612, the analytics server may update the graphical user interface associated with the participant's computing device to display the customized resume dataset. The analytics server may also generate an instruction to update the GUI displayed on the participant's computing device to display the customized resume. The user, operating the computing device, may be able to review the resume and add, subtract, or otherwise modify the information highlighted within the customized resume.

At step 614, the analytics server may generate and transmit a blockchain address based on the customized resume dataset. The analytics server may generate and transmit the blockchain address based on the customized resume data and transmit the key to the participant's computing device. The generated blockchain address may correspond to the hash value of each block instance containing the received selected data. Upon activation of the blockchain address, the analytics server may retrieve the selected decrypted data and display the selected decrypted data on the computing device associated with the activation. In an embodiment, the participant may share this blockchain address with a potential or a future employer or other parties. Once a third party is in possession of the blockchain address, the third party may access the analytics server (e.g., via a user interface provided by the analytics server) and input the blockchain address. In an embodiment, the recipient (potential future employer) may log on to a website provided by the analytics server (using credentials provided by the participant) and receive the customized resume upon entering the blockchain address (received from the participant). The analytics server, upon receiving the blockchain address, may display the customized resume to the recipient. In some embodiments, the analytics server may generate a hyperlink associated with the customized resume. The participant may also freely share the hyperlink with a third party instead of transmitting a paper resume or a resume file/dataset.

In a non-limiting example, and in conjunction with FIG. 3, the analytics server may receive an instruction to generate a customized resume dataset from the blockchain 314. The analytics server may then identify a latest valid blockchain using the methods described above and display data 304 on a computing device of the participant. The analytics server may then receive a selection of different block instances from the participant. For example, the participant may instruct the analytics server to create a customized resume for company B that includes block instance 302a and 302c (not 302b). The analytics server may then query one or more databases to retrieve a public key for Company B. In some embodiments, the analytics server may contact Company B and request a public key. Upon receiving the public key for Company B, the analytics server may encrypt data 304a and 304c using the public key received and generate a blockchain address. The blockchain address may an alphanumerical string or a URL that directs the recipient to customized resume dataset that includes data 304a and 304c. The analytics server may then provide the blockchain address to the participant. The participant may then transmit the blockchain address to Company B. Using the above-mentioned asymmetrical encryption method, the analytics server may ensure data integrity.

In order to view the customized resume dataset, Company B may access the analytics server, for example, by accessing the GUI described above or a website associated with the analytics server. Company B may then input the blockchain address and its private key. The analytics server may retrieve the customized resume dataset using the blockchain address and may then decrypt the encrypted data (via Company B's public key) using company B's private key. This asymmetrical encryption method ensures data security because a bad actor may need the blockchain address and Company B's public and private key in order to fraudulently access the customized resume dataset.

Figure 7:
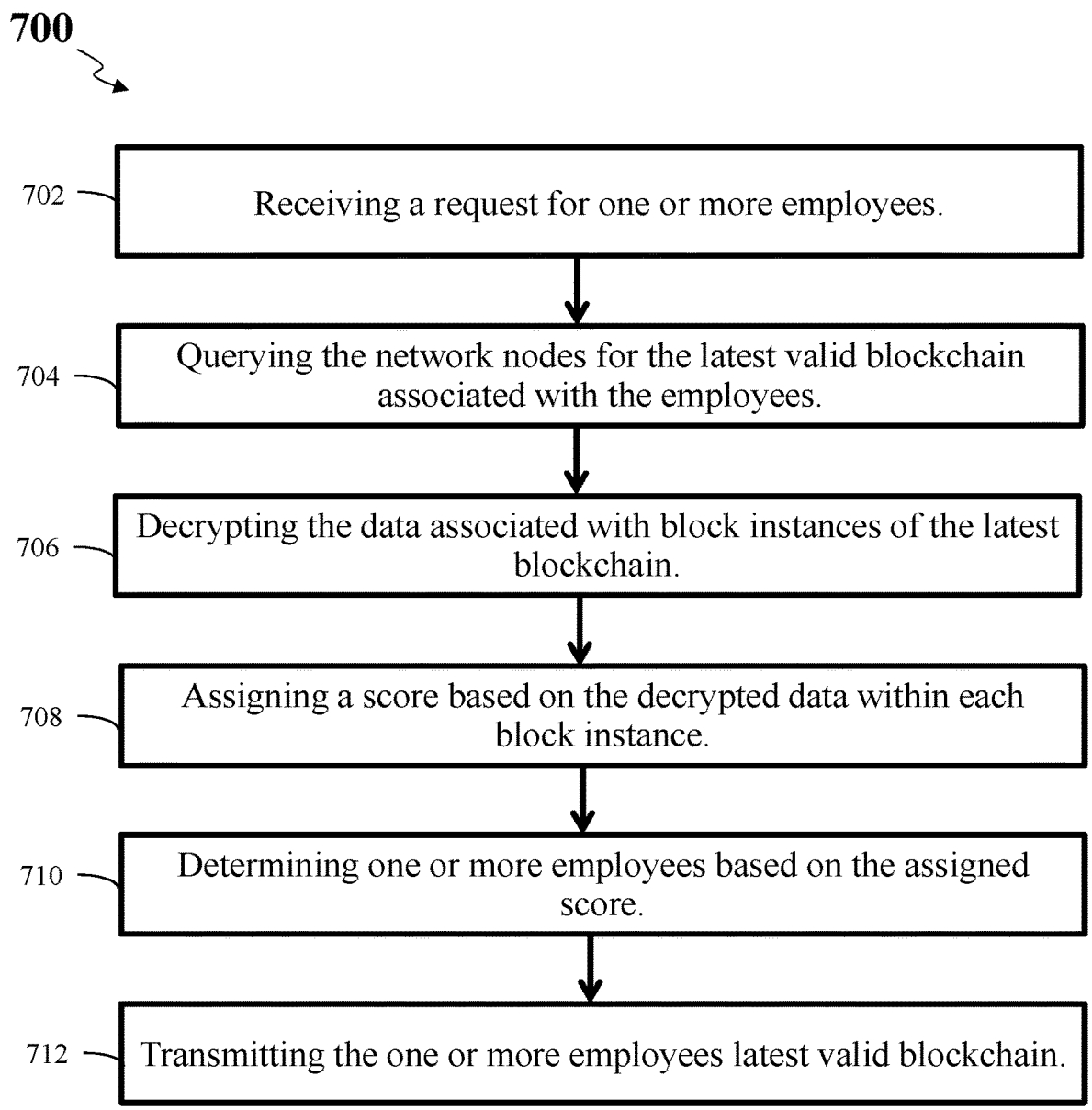
FIG. 7 illustrates a flowchart depicting operational steps for providing a blockchain-based employee search engine, according to an embodiment.

FIG. 7 illustrates execution of an exemplary method 700 for providing an intelligent employee search engine based on an employment blockchain, according to an exemplary embodiment. Other embodiments may comprise additional or alternative steps, or may omit some steps altogether.

At step 702, the analytics server may receive a request from a computing device to search for one or more employees. The computing device may be associated with a manager or any other employer/administrator associated with a blockchain. The analytics server may provide a GUI on the computing device associated with the manager. The GUI may comprise a plurality of input fields configured to receive data associated with employment of an employee or a team member. The GUI may also be configured to receive data regarding one or more projects and/or various attributes regarding the project. For example, the GUI may be configured to receive and transmit project specific data (length, number of employees needed, cost, skills needed, and the like).

In an embodiment, the GUI may be a website hosted by the analytics server, which is available to different administrators/project managers. The purpose of said website may be to collect project information, provide a platform to search for skilled employees, possibly retrieve, and/or notify the employee regarding the pending projects. The graphical user interface may act as an intermediary between different parties involved with a project and may be a central and "one stop" website for searching for and contacting qualified employees. While the described GUI is described herein as a central management tool, neither the analytics server nor the GUI deviates from the spirit of the distributed nature of the blockchain technology. The analytics server provides a management tool to reduce computational burden of keeping record within different and possibly unrelated databases.

At step 704, the analytics server may query and retrieve the latest valid blockchain, wherein the valid blockchain is confirmed by network nodes. In some implementations, the analytics server may poll the network nodes associated with the blockchain instances within the participant's employment blockchain and determine the latest valid blockchain. The analytics server may use a predetermined threshold for determining the latest valid blockchain. For example, the analytics server may query the network nodes for the latest blockchain instance. If the analytics server receives the same blockchain from 51% of the network nodes, the analytics server may determine that the received blockchain is the latest valid blockchain. The predetermined threshold is set upon the level of integrity required for the data and instructions stored in the analytics server or the blockchain. In some embodiments, the analytics server may receive the level of integrity (e.g., the threshold to determine the latest valid blockchain) from the participant, the first computing device, or the second computing device. The analytics server may use a higher predetermined threshold for data requiring a higher level of security and integrity, for example, electronic money transfers. While the present embodiment only describes two computing device for the simplicity purposes, the participant's employment blockchain may include several computer nodes. The analytics server may identify the latest employment blockchain for multiple employees in order to evaluate and select one or more employees that match the request received in step 702.

At step 706, the analytics server may decrypt the data associated with block instances of the latest blockchain. As explained above, the analytics server may validate the latest blockchain by matching the hash values associated with each respective blockchain. Upon determining the latest valid blockchain, the analytics server may generate an instruction to each network node associated with the latest valid blockchain and retrieve data from each block instance within the latest valid blockchain. If the data is encrypted, the analytics server may decrypt the data using a decryption key stored in the key storage database (described in FIG. 1). The analytics server may repeat this process in order to access (e.g., retrieve and decrypt) all data associated with the participant/employee.

At step 708, the analytics server may generate a score for one or more categories associated with the project. The analytics server may query the network nodes associated with each employee's blockchain and receive any recommendation/recognition stored on each block instance within the employee's blockchain. The analytics may generate a score for the employees using the employee's employment blockchain. The analytics server may generate the score using a pre-determined algorithm or based on criteria received from the computing device in step 702. A pre-determined algorithm may generate a score, where each recommendation or recognition retrieved within an employee's blockchain is weighted equally. For example, the pre-determined algorithm may assign 1 point for each time an employee's recognition has been recorded within his/her employment blockchain. The scoring algorithm may also be modified and customized by the computing device. In another example, the analytics server may receive instructions to generate a score with a higher weight assigned to a specific category. The analytics server may receive instructions to favor employees with more recognition and recommendations associated with computer programming skills, which is a vital skill in an on-going project.

In some embodiments, the analytics server may allow customer and employers to record recognition points for each employee. For example, the analytics server may display a GUI on all the network nodes configured to accept recognition points for one or more employees. In an embodiment, the graphical user interface may be a website hosted by the analytics server, which is available to different clients, customer, and employers. The analytics server may receive a request to generate recognition points associated with an employee from a first computing device. In some embodiments, an administrator associated with a computing device (e.g., an education institution, former or current employers, or another employee/peer, client of an employee, and the like) may log into the website hosted by the analytics server to send recognition points to an employee. The analytics server may also receive the numerical value of the recognition points. For example, a client may log on to the website provided by the analytics server may request the analytics server to provide ten recognition points to an employee for outstanding customer service. The analytics server may, using the identification received from the client, identify the employee's employment blockchain, query for the latest valid employment blockchain (explained above), and append a new block instance that reflects the recognition points to the latest valid employment blockchain.

In some embodiments, the data within the recognition block instance may contain a numerical value associated with the recognition points. For example, the client may vary the degrees of recognition and endorsement by donating more/fewer recognition points. The analytics server, upon receiving a request, may query the latest valid employment blockchain and add the recognition points within an employee's employment blockchain. The analytics server may use the collective recognition points to rank the employees or select the employees whose collective recognition points satisfy a threshold.

The analytics server may query and retrieve the latest valid blockchain, query the network nodes for all recommendations associated with computer programming, and generate a score based on the number of recommendations. In other embodiments, the recognitions given to the employees may include a score. For example, the number of points/score may be determined by the coworker when transmitting the recognition.

At step 710, the analytics server may determine one or more employees based on their respective score (e.g., rank or recognition points). The analytics server may determine whether each employee's score within a database (e.g., employees within an institution or employees highlighted/selected by the administrator operating the computing device) satisfies a threshold. The analytics server may receive the threshold from the computing device or use a pre-determined threshold to select the employees. The analytics server may also update the GUI and display the selected employee's identification (e.g., name, identification/employee number, and the like) on the computer device associated with the project manager/administrator.

At step 710, the analytics server may transmit the latest valid blockchain to the computing device. The analytics server may retrieve the latest valid blockchain (as described in step 704) and transmit the latest valid blockchain to the computing device associated with the project manager/administrator or any other computing device selected by the project manager/administrator. In some embodiments, the analytics server may also display the data within each block instance associated with the selected employee's employment blockchain on the project manager's computing device. In some embodiment, the score may be used by the customers to find proper employees. For example, the analytics server (in communication with a call center) may direct or route a customer call to an employee based on their score and/or based on a score desired by the customer. In another example, the analytics server may also record the score and the participant/employee may request the score to be a part of his employment blockchain.

The analytics server may also generate a blockchain address associated with the latest valid blockchain associated with each selected employee and transmit the blockchain address to the project manager's computing device. The analytics server may generate a blockchain address for each employee who satisfies the criteria received in step 702. As described above, the blockchain address may be transmitted to a recipient and allow the recipient to view the employee's blockchain content.

In a non-limiting example, a manger may log into a website provided by the analytics server and may request five employees for a project. The manage may also input one or more attributes associated with the project. The analytics server may then identify a latest valid employment blockchain for all the employees, assign a score for each employee based on the attributes received from the manager, and present the blockchain addresses for the top five employees to the manager.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    receiving, by a server, from a computing device, a request to update an employment record associated with a user, the employment record corresponding to a first blockchain stored on a plurality of first network nodes, the request instructing the server to append a second blockchain stored on a plurality of second network nodes to the first blockchain, wherein the request comprises a first set of data identifying:
        the second blockchain, the second blockchain comprising a plurality of linked block instances,
        a first block instance that is associated with the second blockchain and that is within the first blockchain, wherein the first block instance is an intermediate block instance of the first blockchain and comprises a first hash value, and
        a first network node of the plurality of first network nodes that is associated with the first block instance;
    retrieving, by the server, the second blockchain by generating and transmitting an instruction to the first network node, the instruction configured to receive the second blockchain, the plurality of linked block instances of the second blockchain comprising a second block instance having a second hash value;
    generating, by the server according to a hashing algorithm, a third hash value based at least on the first hash value and the second hash value;
    appending, by the server, the second blockchain to the first block instance within the first blockchain by generating a third block instance comprising the third hash value in the second blockchain; and
    transmitting, by the server, the second blockchain comprising the third block instance and the plurality of linked block instances to the plurality of first network nodes.

2. The method of claim 1, wherein the first hash value is stored in a non-blockchain database associated with the server.

3. The method of claim 1, wherein data within the second blockchain comprises a machine readable document uploaded by the first network node.

4. The method of claim 1, wherein data within the first block instance is not accessible to the computing device.

5. The method of claim 1, wherein the second hash value is based on a location associated with the computing device.

6. The method of claim 1, further comprising: receiving a set of data received from the computing device comprising a machine-readable executable file identifying the second blockchain.

7. The method of claim 1, wherein retrieving, by the server, the second blockchain comprises querying the plurality of second network nodes to verify data within the second blockchain.

8. The method of claim 7, wherein querying the plurality of second network nodes comprises generating and transmitting, by the server, a notification to the plurality of second network nodes to verify data within the second blockchain.

9. The method of claim 8, wherein verification data is received, by the server, from the first network node.

10. The method of claim 1, wherein the plurality of first network nodes do not have access to the second blockchain.

11. A computer system for managing distributed data sources, the computer system comprising:
- a plurality of first network nodes storing a first blockchain;
- a plurality of second network nodes storing a second blockchain;
- a computing device operated by a user associated with the first and the second blockchain;
- a server communicatively in connection with the first plurality of network nodes, the second plurality of network nodes, and the computing device, wherein the server is configured to:
  receive, from a computing device, a request to update an employment record associated with a user, the employment record corresponding to the first blockchain stored on the plurality of first network nodes, the request instructing the server to append the second blockchain stored on the plurality of second network nodes to the first blockchain, wherein the request comprises a first set of data identifying:
    the second blockchain, the second blockchain comprising a plurality of linked block instances,
    a first block instance that is associated with the second blockchain and that is within the first blockchain, wherein the first block instance is an intermediate block instance of the first blockchain and comprises a first hash value, and
    a first network node of the plurality of first network nodes that is associated with the first block instance;
  retrieve the second blockchain by generating and transmitting an instruction to the first network node, the instruction configured to receive the second blockchain, the plurality of linked block instances of the second blockchain comprising a second block instance having a second hash value;
  generate a third hash value based at least on the first hash value and the second hash value, according to a hashing algorithm;
  append the second blockchain to the first block instance within the first blockchain by generating a third block instance comprising the third hash value in the second blockchain; and
  transmit the second blockchain comprising the third second block instance and the plurality of linked block instances to the plurality of first network nodes.

12. The computer system of claim 11, wherein the first hash value is stored in a non-blockchain database associated with the server.

13. The computer system of claim 11, wherein data within the second blockchain comprises a machine readable document uploaded by the first network node.

14. The computer system of claim 11, wherein data within the first block instance is not accessible to the computing device.

15. The computer system of claim 11, wherein the second hash value is based on a location associated with the computing device.

16. The computer system of claim 11, wherein the server is further configured to:
  receive a set of data received from the computing device comprising a machine-readable executable file identifying the second blockchain.

17. The computer system of claim 11, wherein retrieving, by the server, the second blockchain comprises querying the plurality of second network nodes to verify data within the second blockchain.

18. The computer system of claim 17, wherein querying the plurality of second network nodes comprises generating and transmitting, by the server, a notification to the plurality of second network nodes to verify data within the second blockchain.

19. The computer system of claim 18, wherein verification data is received, by the server, from the first network node.

20. The computer system of claim 11, wherein the plurality of first network nodes do not have access to the second blockchain.

* * * * *